United States Patent
Bain

(10) Patent No.: US 11,983,683 B2
(45) Date of Patent: May 14, 2024

(54) PROCESSING PERSONALIZED ELECTRONIC HEALTHCARE PAYMENT TRANSACTIONS WITH A FINANCING PARTNER

(71) Applicant: Salucro Healthcare Solutions, LLC, Phoenix, AZ (US)

(72) Inventor: S Clayton Bain, Phoenix, AZ (US)

(73) Assignee: SALUCRO HEALTHCARE SOLUTIONS, LLC, Phoenix, AZ (US)

( * ) Notice: Subject to any disclaimer, the term of this patent is extended or adjusted under 35 U.S.C. 154(b) by 179 days.

(21) Appl. No.: 17/195,169

(22) Filed: Mar. 8, 2021

(65) Prior Publication Data

US 2021/0256490 A1    Aug. 19, 2021

Related U.S. Application Data

(63) Continuation of application No. 15/973,265, filed on May 7, 2018, now Pat. No. 10,943,218.

(60) Provisional application No. 62/502,331, filed on May 5, 2017.

(51) Int. Cl.
| | |
|---|---|
| G06Q 20/14 | (2012.01) |
| G06F 3/0482 | (2013.01) |
| G06F 3/04886 | (2022.01) |
| G06Q 20/20 | (2012.01) |
| G06Q 20/38 | (2012.01) |
| G06Q 40/03 | (2023.01) |

(52) U.S. Cl.
CPC .......... *G06Q 20/14* (2013.01); *G06Q 20/204* (2013.01); *G06Q 20/3825* (2013.01); *G06Q 40/03* (2023.01); *G06F 3/0482* (2013.01); *G06F 3/04886* (2013.01)

(58) Field of Classification Search
CPC .. G06Q 20/14; G06Q 20/204; G06Q 20/3825; G06Q 40/025; G06Q 40/03; G06F 3/0482; G06F 3/04886
See application file for complete search history.

(56) References Cited

U.S. PATENT DOCUMENTS

| | | | |
|---|---|---|---|
| 8,731,962 B2 * | 5/2014 | Seib | G06Q 20/14 705/40 |
| 2008/0046292 A1 * | 2/2008 | Myers | G06F 16/283 705/3 |
| 2012/0239417 A1 | 9/2012 | Pourfallah | |
| 2017/0160880 A1 | 6/2017 | Jose | |
| 2020/0104961 A1 * | 4/2020 | Romeo | G16H 40/20 |
| 2020/0167871 A1 * | 5/2020 | Basu | H04W 4/029 |

OTHER PUBLICATIONS

USPTO, Non-Final Office Action dated Nov. 25, 2019 in U.S. Appl. No. 15/973,265.
USPTO, Final Office Action dated Apr. 7, 2020 in U.S. Appl. No. 15/973,265.
USPTO, Notice of Allowance dated Oct. 20, 2020 in U.S. Appl. No. 15/973,265.

* cited by examiner

*Primary Examiner* — Paul Danneman
(74) *Attorney, Agent, or Firm* — SNELL & WILMER L.L.P.

(57) ABSTRACT

Embodiments of a computing architecture for healthcare payments are disclosed.

20 Claims, 29 Drawing Sheets

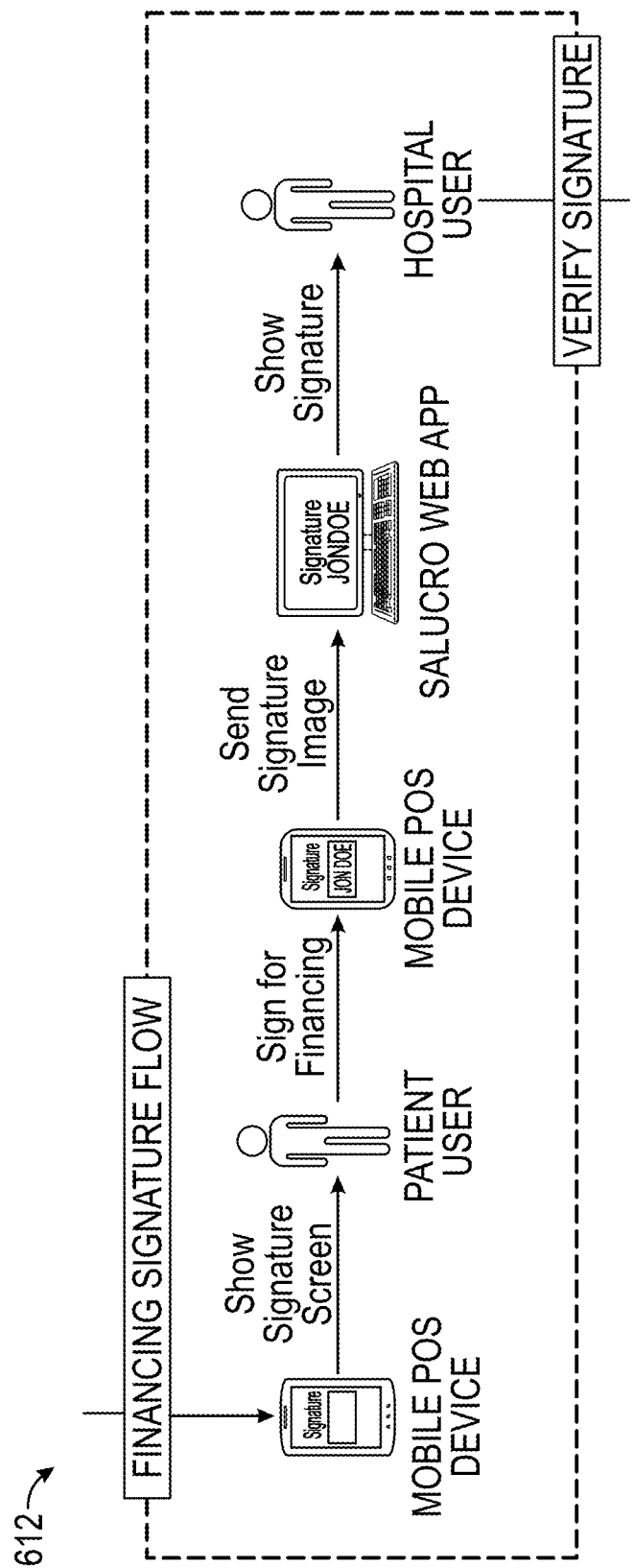

PROCESSING PERSONALIZED ELECTRONIC HEALTHCARE PAYMENT TRANSACTIONS WITH A FINANCING PARTNER

CROSS REFERENCE TO RELATED APPLICATIONS

This patent application is a continuation of U.S. patent application Ser. No. 15/973,265, filed May 7, 2018 entitled "COMPUTING SYSTEM AND METHODS THEREOF FOR PROCESSING PERSONALIZED ELECTRONIC HEALTHCARE PAYMENT TRANSACTIONS, which claims priority to United States Provisional Patent Application Ser. No. 62/502,331, filed May 5, 2017 entitled "SYSTEM AND METHODS FOR A COMPUTING ARCHITECTURE IN HEALTHCARE PAYMENT PROCESSING," the entire contents of which are incorporated herein by reference for all purposes.

BACKGROUND

1. Technical Field

Aspects of the present disclosure relate to a computing system for processing electronic transactions; and more particularly, to a computing system including a point-of-sale (POS) device that is configured to generate a personalized healthcare financing option and process a corresponding electronic payment transaction.

2. Discussion of Related Art

Technology for processing electronic payments in healthcare is limited and must address unique technical challenges. For example, patient data is often distributed across multiple disparate computing environments associated with a healthcare provider, and each of these computing environments may store and manage different aspects of the patient data useful for processing electronic healthcare payments. Yet, these computing environments may not be compatible with one another, or may otherwise be technologically insufficient for processing patient data and electronic payments in a coordinated or cooperative fashion.

In addition, technology for processing electronic payments in healthcare lacks functionality desirable to the patient and healthcare provider alike. For example, electronic payments systems in healthcare do not adequately address the common scenario where a patient has an outstanding balance due to a healthcare provider and cannot pay the full amount of the patient's healthcare bill. Further, electronic payment systems are not able to accommodate situations, unique to healthcare, where the amount of the patient's financial responsibility to a healthcare provider for services rendered (such as a deductible, co-insurance or other amount) may not be known until the insurance claims are adjudicated.

Moreover, technology for processing electronic payments in healthcare is constrained by various complex regulations related to the security of financial transactions and privacy of patient information. It is with these observations in mind, among others, that various aspects of the present disclosure were conceived and developed.

BRIEF DESCRIPTION OF THE DRAWINGS

FIG. 6F is a flow diagram illustrating functionality provided by the computing system described herein for accessing a processing a digital signature associated with the electronic financing option data, according to aspects of the present inventive concept.

Figure 1A:
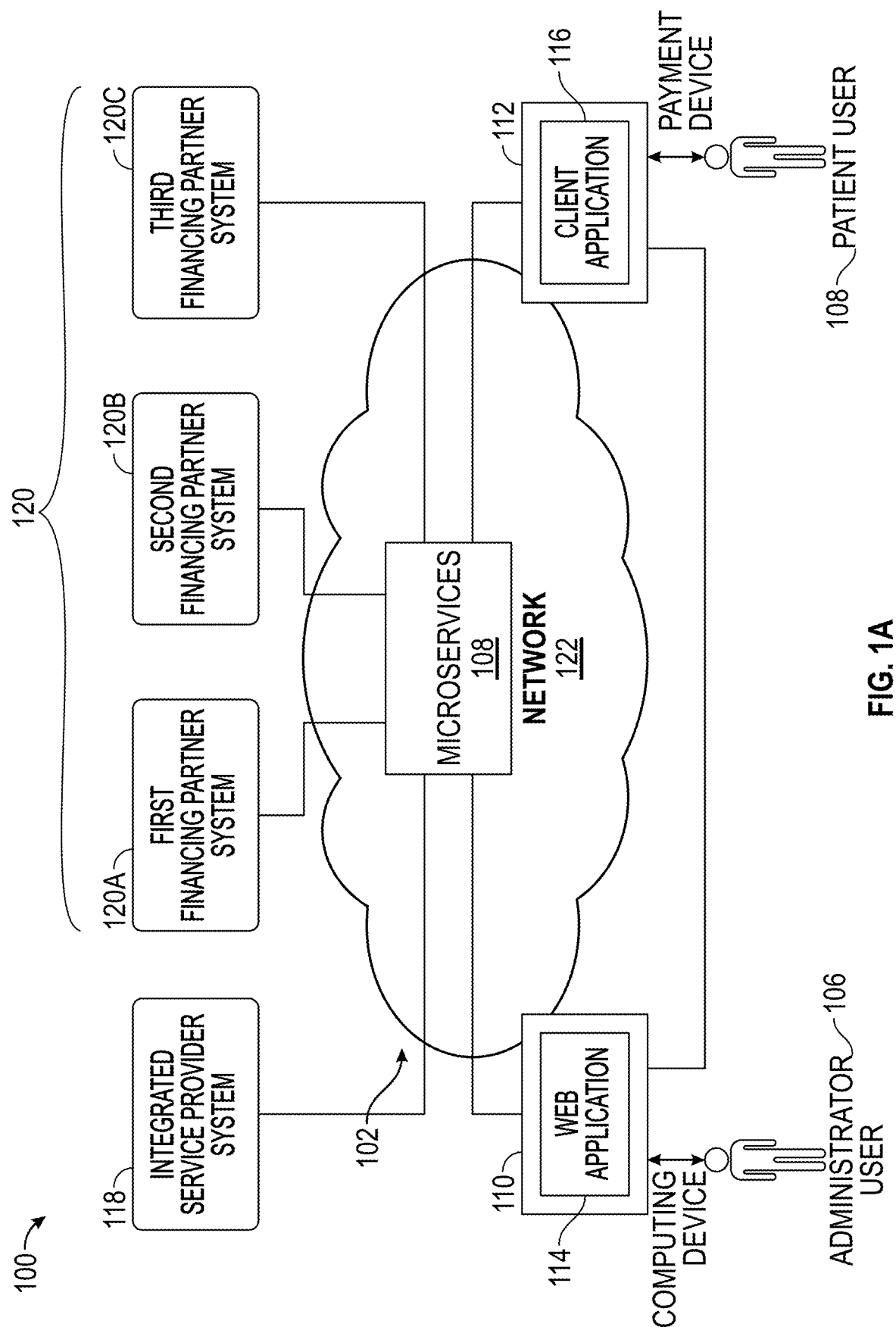
FIG. 1A is a diagram of a computing system for processing electronic payments associated with healthcare, according to aspects of the present inventive concept.

The foregoing and other objects, features, and advantages of the present inventive concept set forth herein should be apparent from the following description of particular embodiments of those inventive concepts, as illustrated in the accompanying drawings. The drawings depict only typical embodiments of the present inventive concept and, therefore, are not to be considered limiting in scope.

DETAILED DESCRIPTION

Aspects of the present inventive concept involve a computing system for integrating multiple devices in order to generate and process personalized electronic healthcare payment transactions. In particular, the computing system is configured to establish and temporarily maintain secured communication channels between a point-of-sale (POS) device and a plurality of remote computing environments associated with financing partners or information providers having access to financial data associated with a patient. The computing system may also be configured to establish and maintain secured communication channels with internet browsers or applications executable via mobile devices or other such computing devices. Utilizing the secured communication channels and computing functionality described herein, the computing system is further configured to access patient data received at the POS device and other devices, convert or otherwise package the data to a predetermined format compatible with various application programming interfaces (API)s or other entry points associated with the remote computing environments, and apply the patient data to the APIs to retrieve financial data unique to a patient. This financial data may then be processed according to predetermined logic to generate at least one personalized healthcare payment option (e.g., financing option) that may be tailored to the individual patient, taking into account various predetermined rules associated with a healthcare provider or other user of the system, including the patient's financial history, propensity-to-pay scores, credit score, etc. In addition, the personalized healthcare payment option may be displayed to the individual patient using the POS device, the patient may be verified, the patient may input a digital signature to accept the personalized healthcare payment option (or select a checkbox or otherwise indicate consent to select the option or accept terms and conditions, authorizations, consents, or financing agreements associated with the use of the system and the financing option), the patient may input information requested from the system or a lender, and the POS device may enable the patient to complete an electronic payment related to the personalized healthcare payment option.

The novel design and functionality of the computing system described herein affords numerous technical improvements by e.g., accommodating interactions between different disparate computing environments and the POS device simultaneously and in real time to process personalized electronic healthcare payments from one or more lenders while still addressing compliance with applicable regulations. Referring to the drawings, one embodiment of a computing system for processing electronic payment transactions associated with healthcare financing options is illustrated and generally indicated as 100 in FIGS. 1-9.

Referring to FIG. 1A, a computing system for processing personalized healthcare payment transactions ("computing system"), designated 100, may include an electronic payment computing platform 102 (hereinafter "payment platform 102") comprising various hardware and software components or modules configured to generate and process personalized electronic healthcare payments (associated with e.g., financing options), to enable an administrator user 106, such as an individual employed with a healthcare provider, accounts receivable, or third-party assisting with healthcare collections, to receive an electronic payment from a patient user 108. In some embodiments, the payment platform includes a computing device 110 accessible to the administrator user 106, and a payment device 112 accessible to the patient user 108. The computing device 110 may include one or more of a server such as a Hypertext Preprocessor (PHP) server or other application server, and/or a rack, mainframe, terminal, or other such device operable to implement functionality associated with management of patient data and electronic healthcare payment transactions, as described herein. The payment device 112 may include one or more of a tablet, mobile phone, smartphone, or point-of-sale (POS) device, desktop, laptop, or other such device configured to implement functionality associated with receiving data input from the patient user 108, processing a digital signature of the patient user 108, displaying one or more personalized healthcare payment options, selecting a personalized healthcare payment option, and processing an electronic payment transaction, among other features described herein. The payment platform 102 is not limited to the aforementioned devices, and may be implemented as part of a platform as a service (PaaS), cloud environment (i.e., may be cloud-based), or implemented in other similarly versatile forms.

In some embodiments, the payment platform 102 handles login and authentication of users 106, and 108 includes a web application 114 executed by the computing device 110, and a client application 116 executed by the payment device 112. The web application 114 may be configured to send lists of sensitive data requirements to the client application 116. Further, executing the web application 114, the computing device 110 may handle login and authentication of users, may serve the client application 116, may host one or more APIs to allow clients to asynchronously perform system actions and retrieve data, may facilitate electronic payment transactions and retrieve data, and may manage data access and business rules. In some embodiments, the web application 114 is configured to enable healthcare providers to set parameters relating to the types of lenders and financial offerings available to patients and to adjust the healthcare provider's financing options. For example, the healthcare provider may designate whether recourse or nonrecourse lender financial options would be displayed or the minimum balance eligible for the financial options offered by the healthcare provider (i.e., recurring payment plans). One or more predetermined algorithms may be implemented to convey certain information or analysis of considerations relevant to the financing interaction.

The client application 116 may return sensitive data field inputs, as further described herein. Sensitive data may include predetermined portions of patient data that raises data privacy considerations, considerations associated with healthcare regulations, and the like. The client application 116 may include a browser-based application and may define a user-interface (UI) (not-shown in FIG. 1A) to interact with various end users. The client application 116 may be accessible via different interfaces depending upon where the client application 116 is being accessed and who is navigating the application (e.g., the patient, healthcare provider, or both). The client application 116 drives payment and financing flow, and in some embodiments, may utilize the React JavaScript library. In some embodiments, the client application 116 may be encoded or otherwise implemented using React.js, Redux and/or Redux-Saga by MIT, Flow, Jest, React Bootstrap, Gulp, Webpack, Bootstrap, and the like.

Figure 1B:
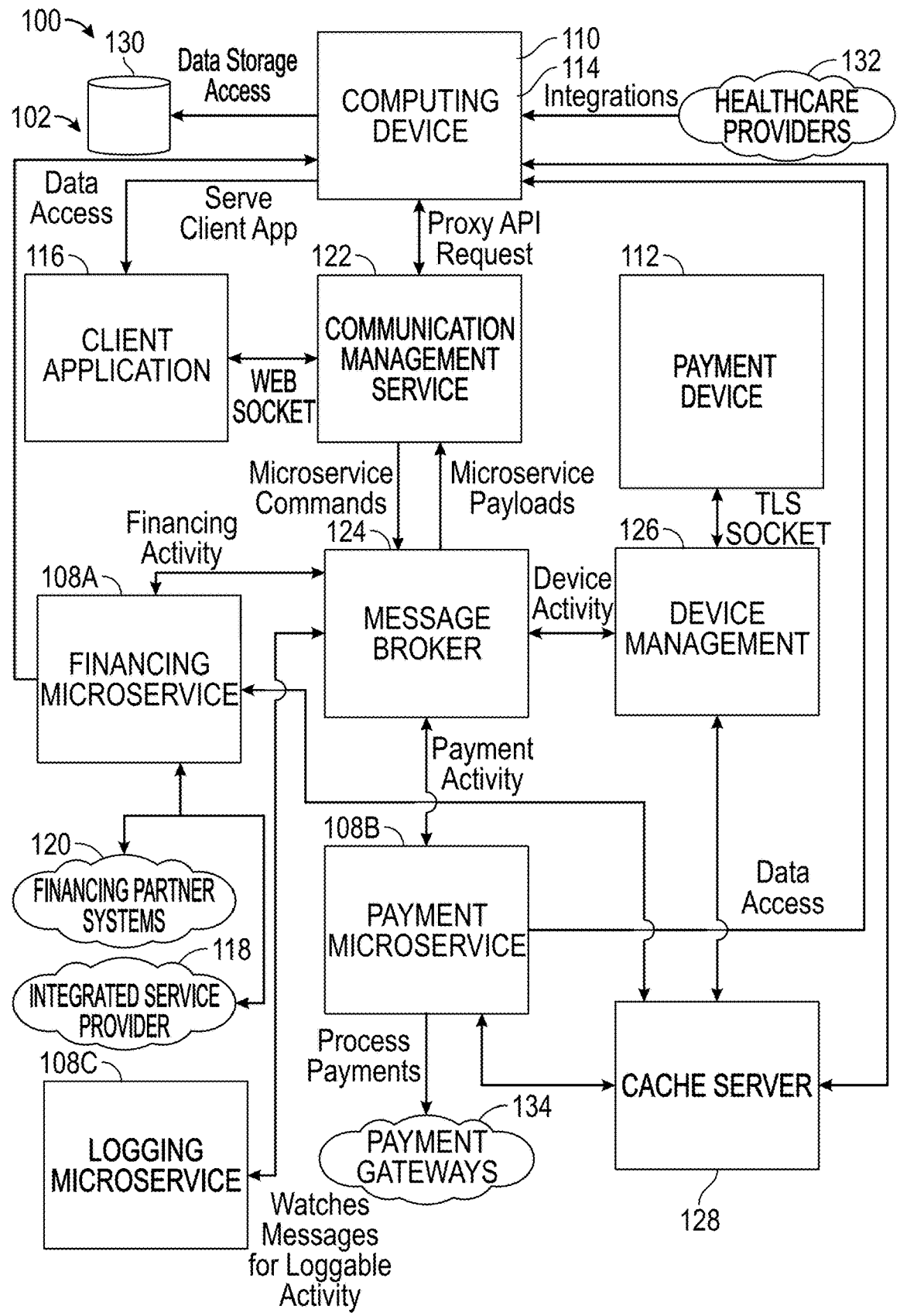
FIG. 1B is a diagram illustrating further possible components of the computing system of FIG. 1A, according to aspects of the present inventive concept.

As further shown, the payment platform 102 may further include one or more microservices 108, such as a financing microservice (shown in FIG. 1B). Microservices 108 may be included to implement aspects of the payment platform 102 as modular components or services such that they may be independently deployable as needed by various devices, such as the computing device 110, devices of a cloud, or otherwise. For example, each of the microservices 108 may be configured to support different specific tasks, may define unique respective interfaces or APIs, and may run individual dedicated processes. Utilization of the microservices 108 may be suitable for improving security of patient data, improving integration between devices of the payment platform 102 and other devices, and may provide other advantages as described herein.

As further shown, the computing system 100 includes an integrated service provider system 118 and a plurality of financing partner systems 120, illustrated as a first financing partner system 120A, a second financing partner system 120B, and a third financing partner system 120C. The integrated service provider system 118 may be associated with a healthcare provider, credit agency, a credit bureau, or other third party capable of generating or aggregating information about a patient related to the patient's ability/inability to pay down a healthcare bill, including propensity-to-pay scores, credit scores, or any other information about credit history, payment history, or other such information associated with patients. The financing partner systems 120 may be associated with lenders, financing program managers or marketers, or banking institutions and the like and may provide financing options to patients for healthcare services rendered by a healthcare provider, taking into account information about the propensity-to-pay scores, credit scores, or other information associated with patients as derived from the integrated service provider system 118. It should be understood that the computing system 100 may include any number of such systems that may return financial or other data in response to patient data received from the payment platform 102, as described herein.

Devices of the payment platform 102, such as the payment device 112 or the computing device 110, may be in operative communication with the integrated service provider system 118, and the financing partner systems 120 via a network 122. The network 122 may include any network capable of transmitting communications from one device to another device such as, e.g., the Internet, a virtual private network, a local area network, a wide area network, a Wi-Fi network, a cellular network, or any combination thereof. In other words, the network 122 allows the various components of the computing system 100 to communicate with one another.

By novel design of the computing system 100, the payment platform 102 is integrated with the lenders associated with the financing partner systems 120 and information providers associated with the integrated service provider system 118 so that financing options and/or financial data about a patient can be retrieved via a single platform without excess requests for information. For example, without the payment platform 102 of the computing system 100, a healthcare provider or other entity, administrator, or patient user desiring to interact with (e.g., request possible financing options from) each of the financing partner systems 120 individually would need to submit three separate requests; one request per each of the financing partner systems 120. The computing system 100 streamlines this process by providing unified interfaces and the payment platform 102 to integrate the components of the computing system 100, eliminating the need for repeated data input. In addition, healthcare financing options are provided to patients via a single interface (not shown in FIG. 1A) of the client application 116. This provides the patient user 108 with the opportunity to more easily compare and evaluate their payment options. It also provides a healthcare provider with opportunities to facilitate payment options that are consistent with internal payment plan requirements.

In addition, in some embodiments, the computing system 100 enables healthcare providers, or administrator users (as defined above) to provide patients with payment plans managed by the healthcare provider themselves. The computing system 100 can be customized with provider-specific settings that manage any restrictions the provider wishes to place on these payment plans (e.g., minimum payments, allowed payment intervals, balance restrictions). With those restrictions in consideration, the computing system 100 can generate several responsive payment plans utilizing a recommendation algorithm. The algorithm uses the propensity-to-pay score, patient balance, provider customizations, and other relevant billing data to generate a set of best-fit options for the patient.

Referring to FIG. 1B, the computing system 100 and the payment platform 102 may include additional technical features. For example, in one embodiment, the microservices 108 may include a dedicated financing microservice 108A. The financing microservice 108A may define one or more communications processes that enable extended or continuous delivery and deployment of secure communications channels and data transmission, and may involve technology-agnostic protocols such as HTTP, and be implemented using a dedicated server, dedicated devices of a cloud, or other computing device. In some embodiments, the financing microservice 108A may provide open-socket connections between various components of the computing system 100 (such as the payment device 112 and the financing partner systems 120) to maintain connections for longer periods of time so that connections do not time out or otherwise terminate. For example, the financing microservice 108A may be operable to maintain connections between the client application 116 and the financing partner systems 120 to facilitate back and forth data transmissions in order to generate financing options for a healthcare bill. The financing microservice 108A is believed to be advantageous for this specific application in healthcare payment financing. Traditional APIs, for example, may be slow to respond, and multiple calls may be needed to enable the back and forth transmissions to generate healthcare financing options for a patient, taking into account all of the sensitive information that may need to be addressed and processed. Yet, real time communications and reduced idle time at the client application 116 for managing healthcare payments is desirable. The financing microservice 108A is advantageously operable to maintain connections for e.g. 30 seconds to 2 minutes and longer as needed to generate healthcare payment financing options in real time, as described herein. Further, the financing microservice 108A as described provides enhanced security of the patient's information and may be implemented using a dedicated server. In some embodiments, the financing microservice 108A is utilized to facilitate propensity-to-pay inquiries (and/or general inquiries about a patient's financial history or behavior), generate suggested reoccurring payment plans using an algorithm, retrieve financing offers, and manage integration with third party APIs. In some embodiments, the financing microservice 108 may be encoded or otherwise implemented using a Lumen framework.

In some embodiments, the microservices 108 may further include a payment microservice 108B and a logging microservice 108C. The payment microservice 108B may be implemented to handle payment processing, integrate with a healthcare provider's specific payment settings, manage reoccurring payment plans, and manage integrations with third party payment gateways (134 in FIG. 1B). The logging microservice 108C may be responsible for logging important user and system activities. The logging microservice 108C may further maintain auditability of the payment platform 102 by monitoring channels used by other microservices and tracking communications.

As further shown in FIG. 1B, the computing system 100 may include a communication management service 122, which may be implemented via a GoLang server, to facilitate communications across various nodes of the computing system 100. The communication management service 122 may define a variety of data transmission protocols depending upon the communications being generated, such as websockets, message buses, and https, and the like. In some embodiments, the communication management service 122 functions as a portal through which connecting nodes may only need to be concerned about how they communicate with it rather than having to implement multiple protocols to communicate with all the other architectural nodes.

The communication management service 122 as contemplated may be operable to provide various advantages specific to the sensitive nature of healthcare payment processing. For example, the client application 116 may need to communicate with one or more APIs of the web application 114 or the financing microservice 108A. Communications with APIs of the web application 114 may be facilitated through hypertext transfer protocol secure (HTTPS), the payment device 112 may communicate through transport layer security (TLS) protocols, and the financing microservice 108 may communicate through the Advanced Message Queuing Protocol (AMQP), although the present disclosure is not limited in this regard. The overhead of the client application 116 having to directly implement these protocols may be onerous or, in some cases, not possible. As such, these communications may be routed through the communication management service 122. With this layer in place, the client application 116 may only need to maintain communication through a websocket with that single service. The communication management service 122 may then relay requests and responses to the intended architectural nodes, handling the protocol translations. In some embodiments, the communication management service 104 may be encoded or otherwise implemented using Draw2D, Gorilla Websocket, AMQP, and the like.

Another key aspect of the communication management service 122 may include removing certain sensitive data from more vulnerable nodes in the computing system 100. For example, the client application 116 may be exposed to end-users through a browser. Since external entities interact directly with this application there may be some sensitive pieces of information that it would be undesirable to expose for privacy or other reasons. The communication management service 122 is operable to withhold or mask this type of information, while still maintaining the ability to provide it to other, more secure nodes that require the data. As a specific example, the financing microservice 108A may request a guarantor's or patient's social security number (SSN) to run propensity-to-pay checks or to receive financing offers as further described herein. Since this or other information could be considered sensitive information, it may be desirable to avoid exposing such information to the client application 116 in some interactions. When the communication management service 122 receives a request to retrieve the SSN it may relay that request to the payment device 112 to allow for the input of that data. When the SSN is sent back from the payment device 112, the communication management service 122 can mask that SSN (only showing the last 4 digits) before sharing that data with the client application 116. In the event the client application 116 signals that it is needed to use that SSN in a future request, say a request to generate financing offers, it may then recognize that it has a non-masked version of that value and merge it into the request before relaying it to the financing microservice 108A.

As further shown, the computing system 100 may further include an asynchronous message broker 124, a device management service 126, and a cache server 128. The asynchronous message broker 124 may be implemented using NATS. The message broker 124 may queue requests and responses to various microservices 108, e.g., may interact with the financing microservice 108A to queue requests and responses to other various microservices 108. The device management service 126 may be implemented using a GoLang server, may handle device registrations, facilitate communications with web clients and devices of the computing system 100, and facilitate communications between system services and devices. The cache server 128 may manage shared cache for back-end services, and be implemented using a memcached server.

In addition, as shown, patient data and other information of the computing system 100 may be stored within a database 130. In some embodiments, the database 130 may be implemented using MySQL or other such database platform. In some embodiments, any of the aforementioned components of the computing system 100 may be encoded or otherwise implemented using a Laravel framework, although the present disclosure is not limited in this regard.

Figure 2A:
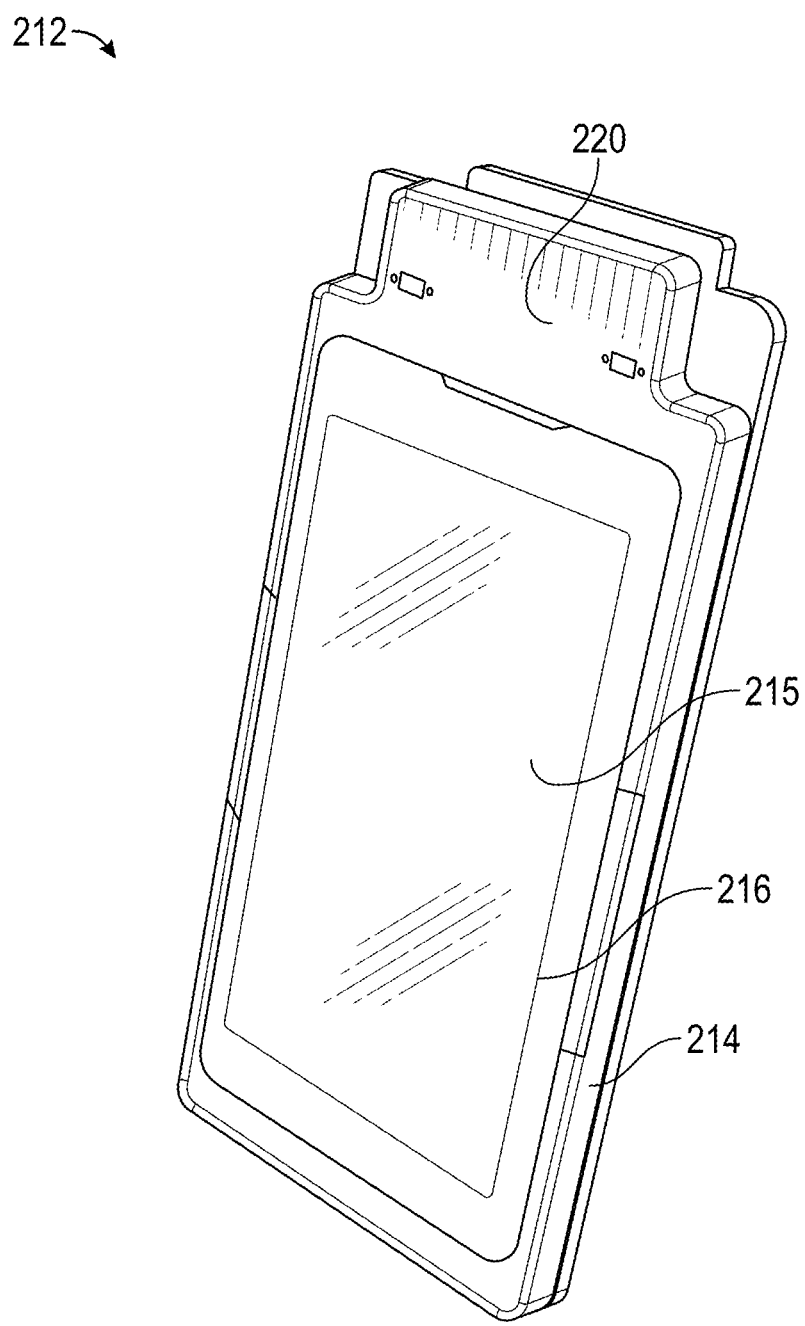
FIG. 2A is a perspective view of a point-of-sale (POS) device for use with the computing system described herein, according to aspects of the present inventive concept.
Figure 2B:
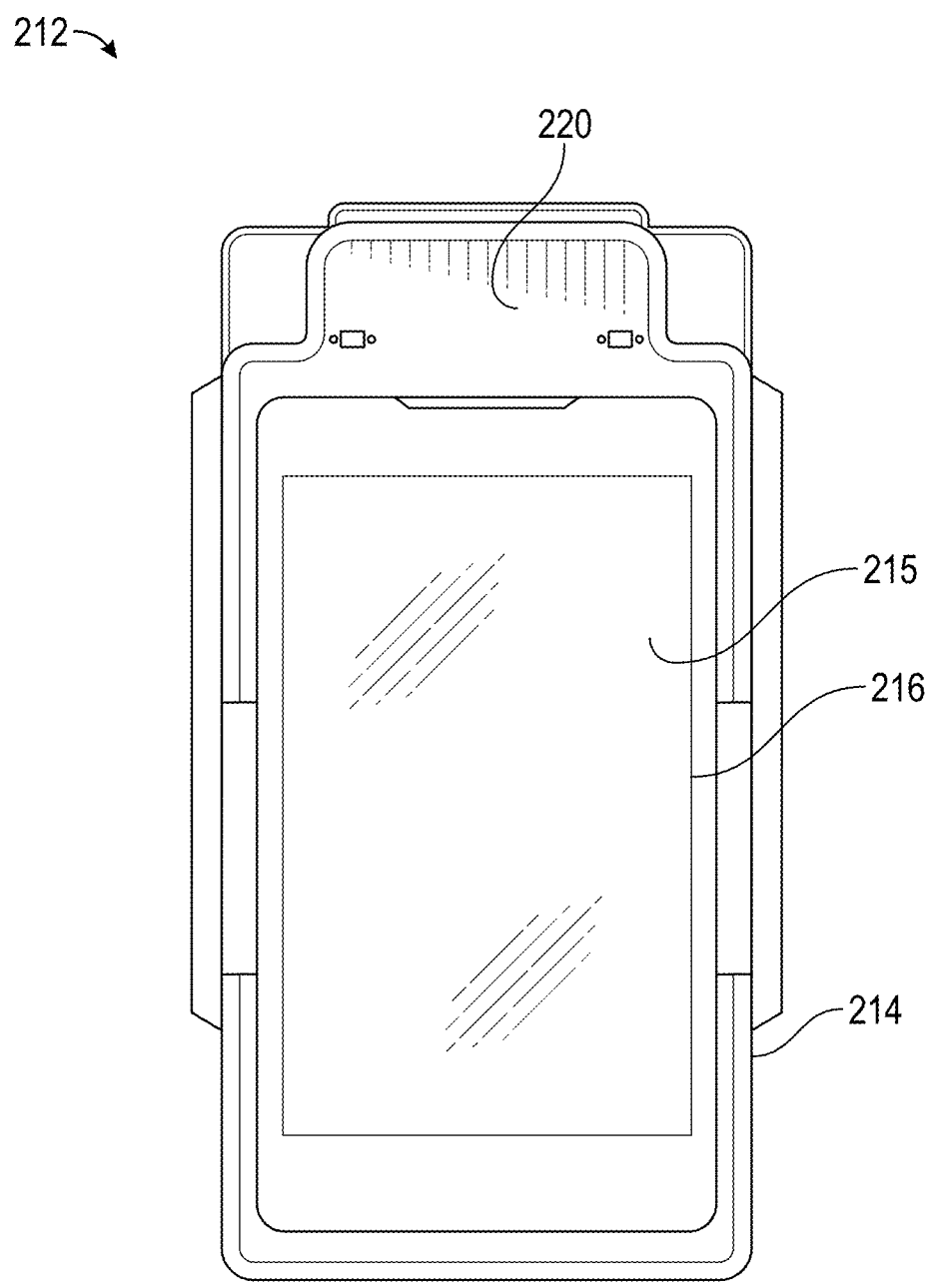
FIG. 2B is a front view of the POS device of FIG. 2A for use with the computing system described herein, according to aspects of the present inventive concept.

Referring to FIGS. 2A-2B, in some embodiments, the payment device 112 may be a point-of-sale (POS) device 212 or payment terminal configured with aspects of the client application 116. The POS device 212 may include a body 214 defining a display 215, which may be configured with touch-screen functionality. The POS device 212 may access aspects of the client application 116, which may be provided through a user interface 216 on the display 215. The POS device 212 may further include a payment card reader 220 defined along the body 214 for processing electronic card payments associated with credit or debit card transactions.

The POS device 212 may comprise a secure electronic device which may allow a user to swipe or otherwise access information about a credit or debit card using the payment card reader 220 a process an electronic healthcare payment at a healthcare provider location or other suitable location. Utilizing the display 215 and user interface 216, the POS device 212 may receive a patient or other user's input of sensitive data such as guarantor data (e.g., social security number) and may be used to securely and privately display financing offers to the patient, and allow the patient to interact with the payment platform 102 to access and select financing offers to pay a healthcare bill as described herein. The POS device 212 may further be configured to handle acceptance of financing terms and accept digital signatures to finalize financing for a healthcare balance.

Aspects of the client application 116 may be loaded to the POS device 212 or otherwise executed by the POS device 212, such as Android, such that the POS device 212 is configured to accommodate the input, display, and financing option selection functionality described herein. The POS device 212 may be EMV and PCI certified, may be configured to accept EMV, magstripe, and NFC/contactless transactions, and may meet specific certification requirements such as PCI PTS SCR 4.1, EMV L1 and L2, EMV L1 contactless, Visa payWave, Amex Express Pay 3.0, Discover D-PAS 1.0 and Mastercard contactless. The display 215 may include a capacitive touchscreen (not shown) with protective features such as Gorilla Glass. The POS device 212 may further include one or more processors and a memory component for executing instructions defined by the client application 116. The POS device 212 may be battery-operated or power via wired connection, and may include other features for verification purposes such as a camera, fingerprint reader, GPS system, or the like.

Figure 3:
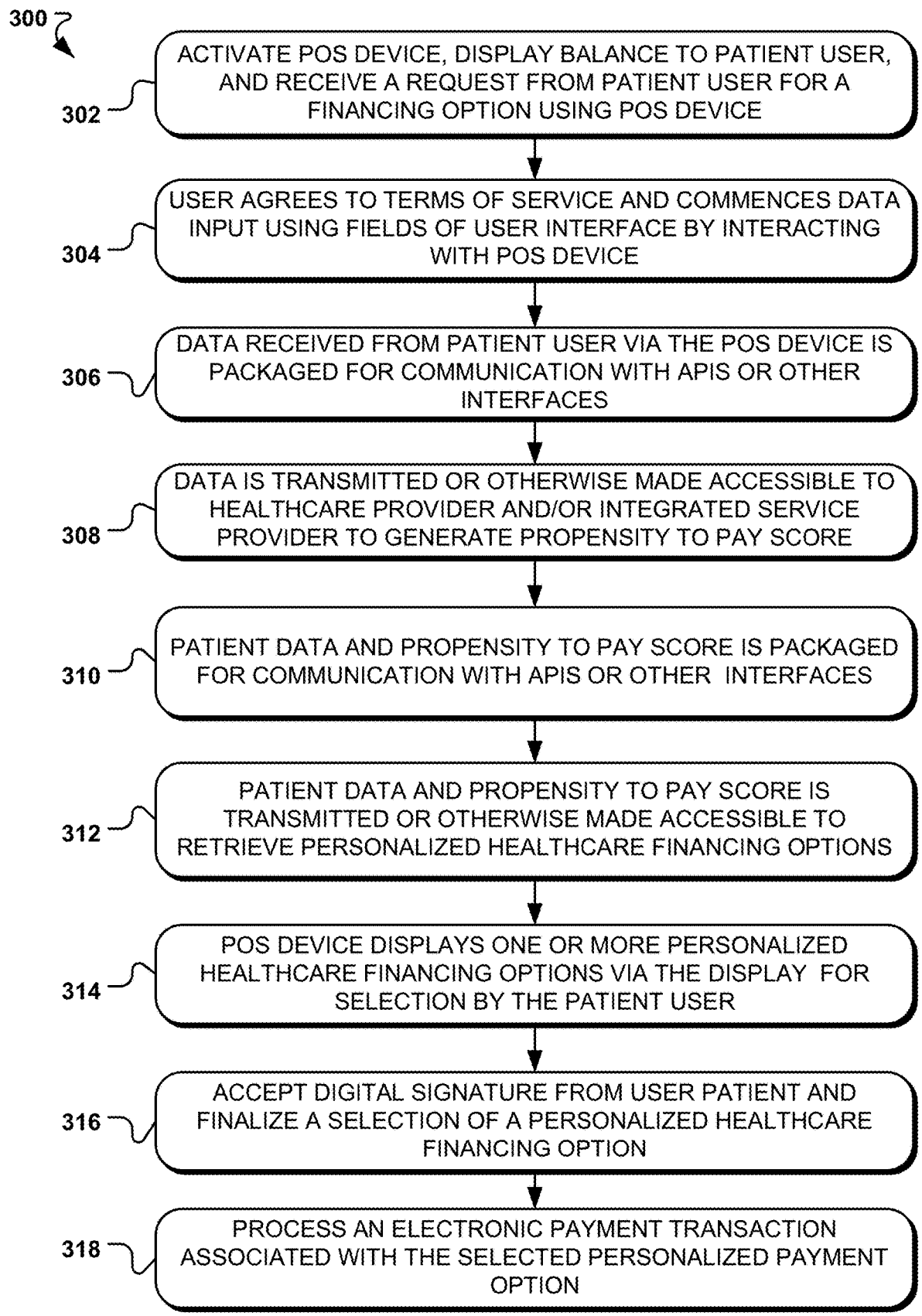
FIG. 3 is an exemplary process flow for implementing aspects of the computing system for processing electronic payments associated with healthcare described herein, according to aspects of the present inventive concept.

Referring to FIG. 3, implementation and further detail regarding the functionality of the computing system 100 may be illustrated according to the process flow 300 with reference to FIGS. 1A-1B and 2A-2B, 5-8, and 10-14. As reflected in block 302 of the process flow 300, a patient may be presented with the POS device 212 (or the mobile payment device 112), and may log-in or otherwise be verified (e.g., using a password, biometric identifier such as a fingerprint, and the like). Further, referring to FIGS. 6A-6B and FIGS. 7A-7C, the web application 114 of the payment platform 102 may also identify that the POS device 212 has been selected, activated and is otherwise available for use, and a notification may be presented to the patient user 108 via the display 215.

Figure 5A:
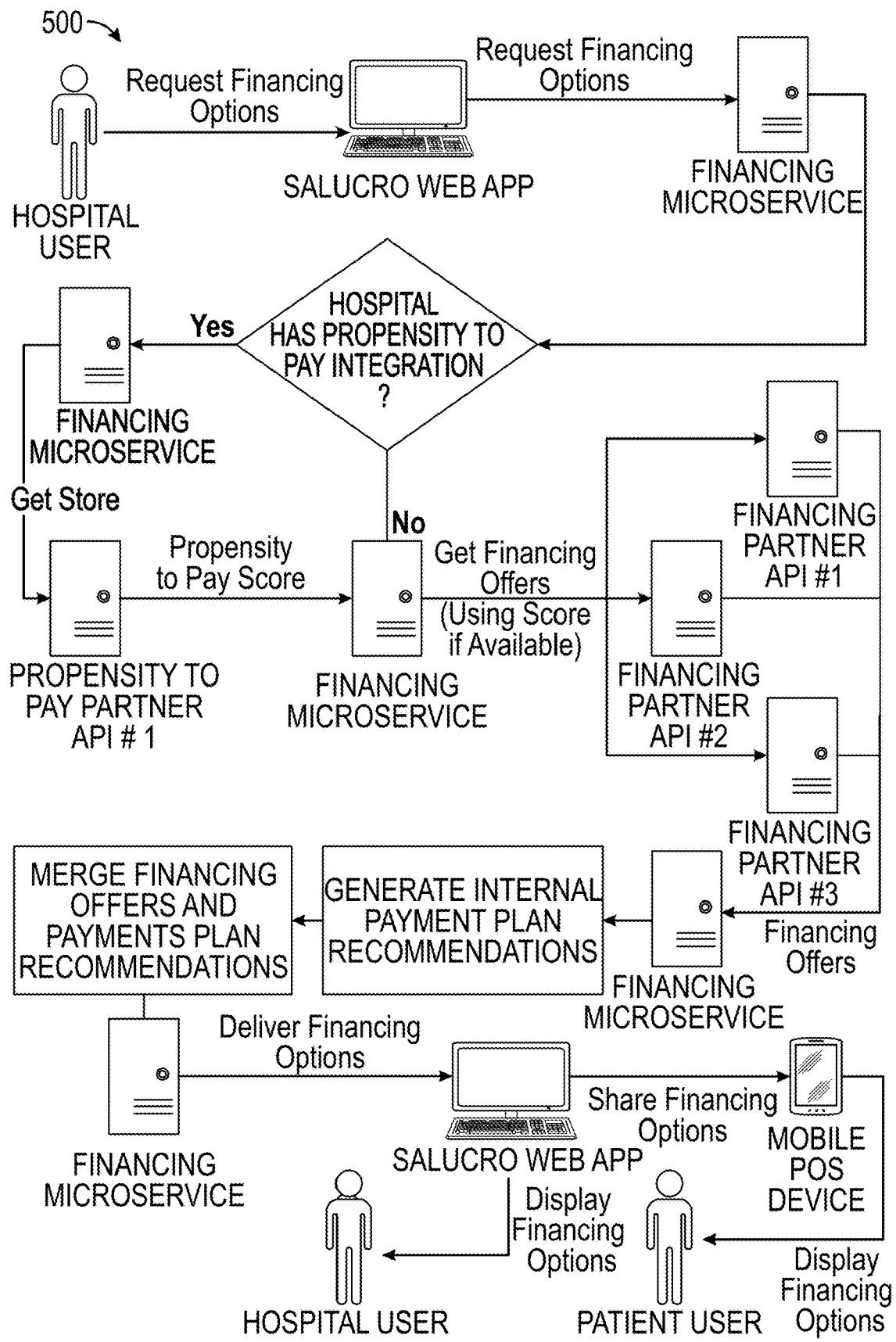
FIG. 5A is a diagram illustrating logic and/or functionality associated with possible interactions between various possible components of the computing system for processing electronic payments associated with healthcare as described herein, according to aspects of the present inventive concept.

In addition, a balance for various healthcare services rendered to the patient may be presented to the patient via the display 215 of the POS device 212. As illustrated by FIG. 5A, the patient may (in response to a prompt or otherwise) electronically submit a request financing options to pay off all or a portion of the balance displayed, and this request may be forwarded to the financing microservice 108A. Utilizing the financing microservice 108A, the payment platform 102 may access the request, may also access the balance, and may further access or retrieve data associated with the patient such as a patient account, demographic, balance, a social security number, and other identifying information from a patient accounting system or other systems, or from the patient directly ("Patient Information"). In some embodiments, the aforementioned information about the patient may be submitted as parameters of the request. Submission of the aforementioned request is exemplified in FIG. 10.

Figure 6A:
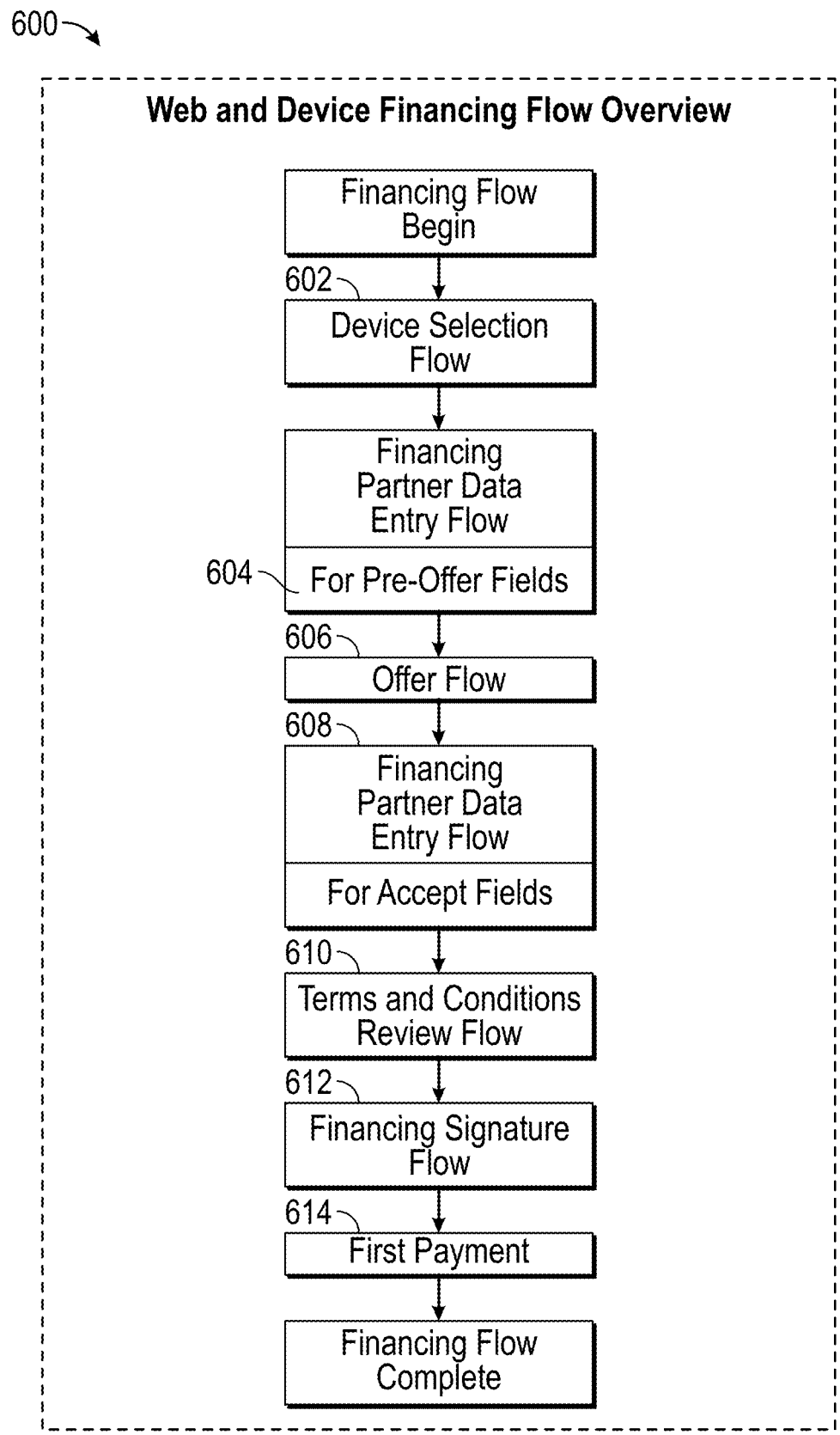
FIG. 6A is a flow diagram illustrating an overview of functionality provided by the computing system described herein for generating electronic financing options, according to aspects of the present inventive concept.
Figure 6B:
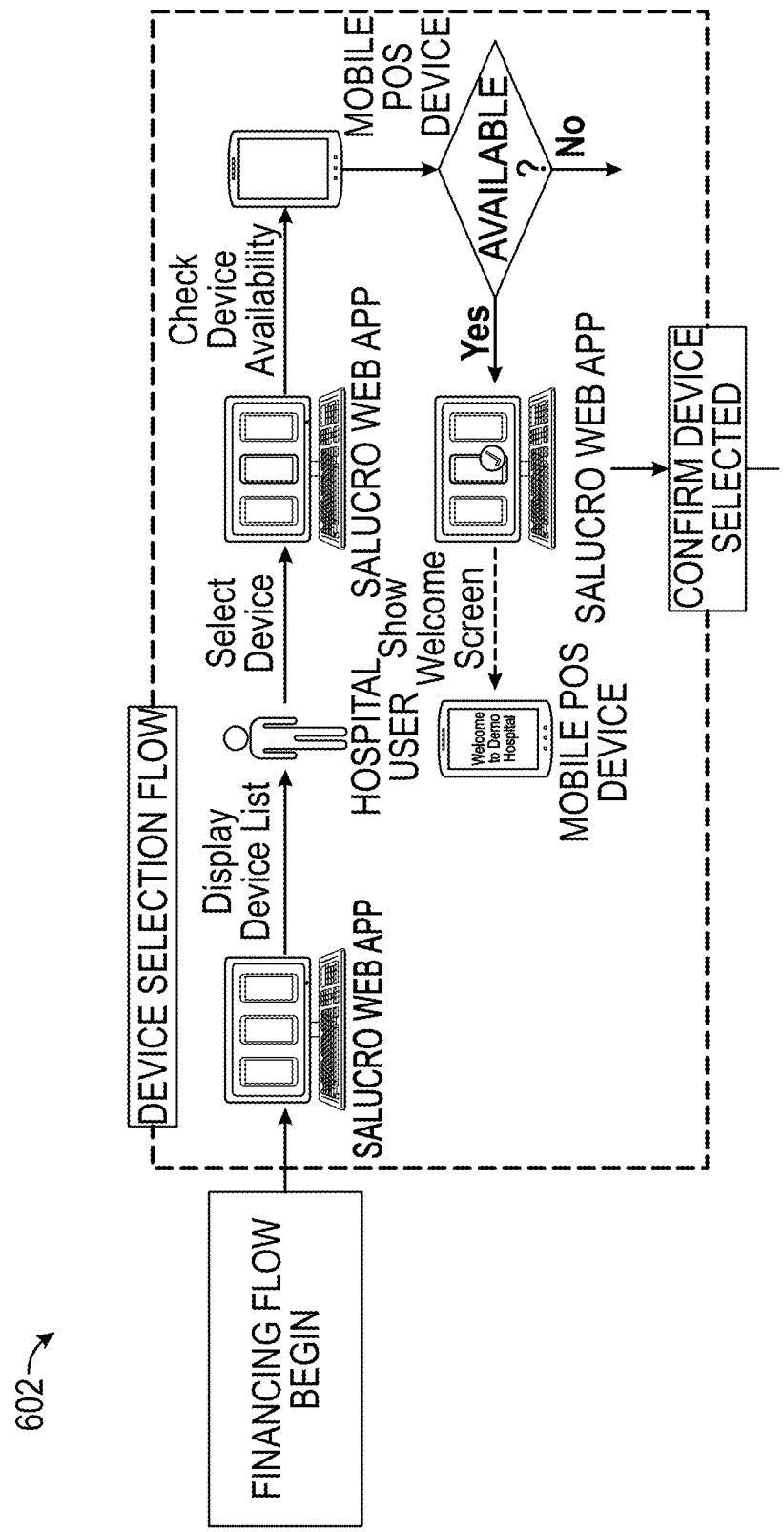
FIG. 6B is a flow diagram illustrating functionality provided by the computing system described herein for accessing financing partner data, according to aspects of the present inventive concept.
Figure 6C:
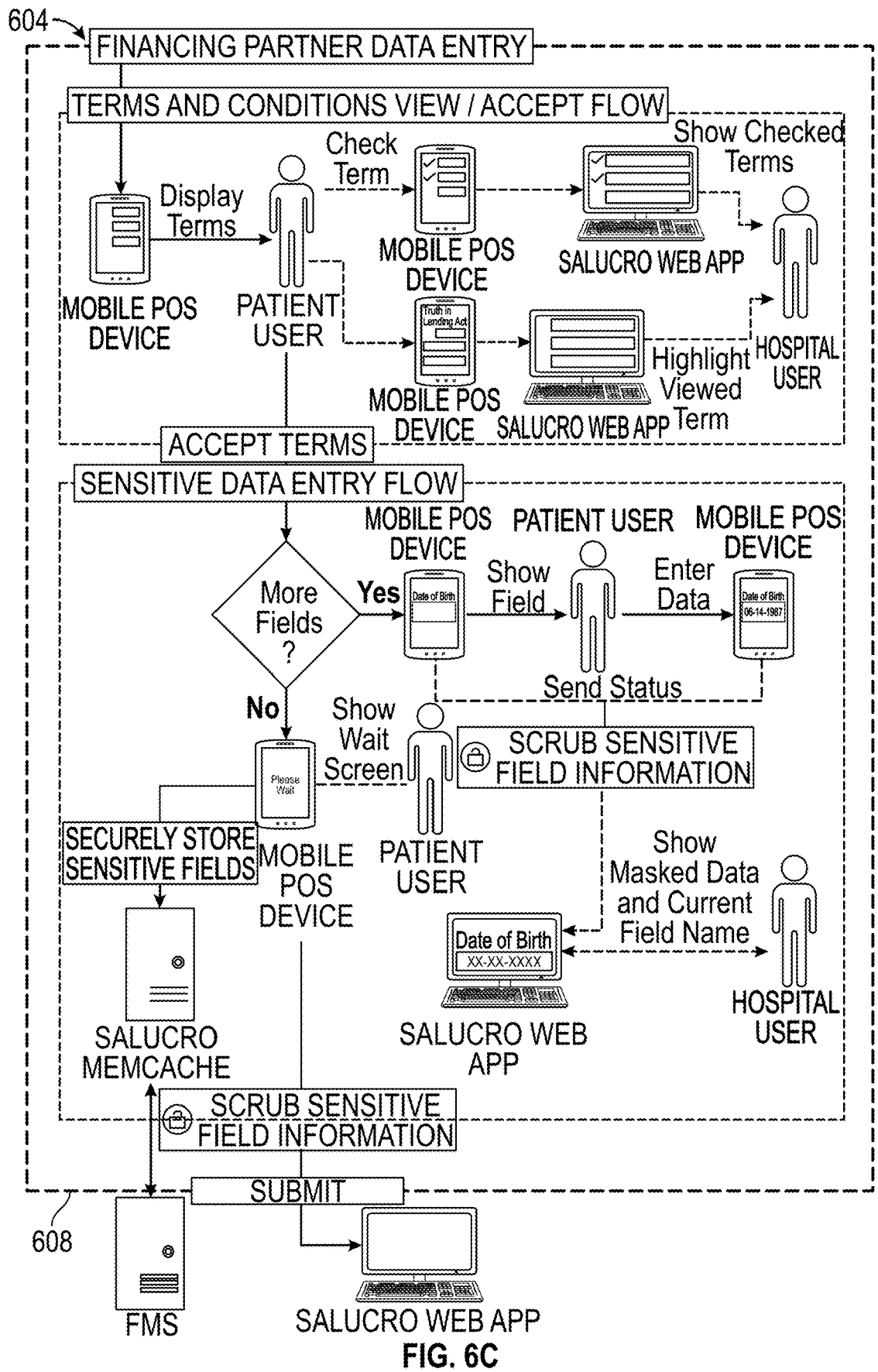
FIG. 6C is a flow diagram illustrating functionality provided by the computing system described herein for selecting a device, according to aspects of the present inventive concept.
Figure 6D:
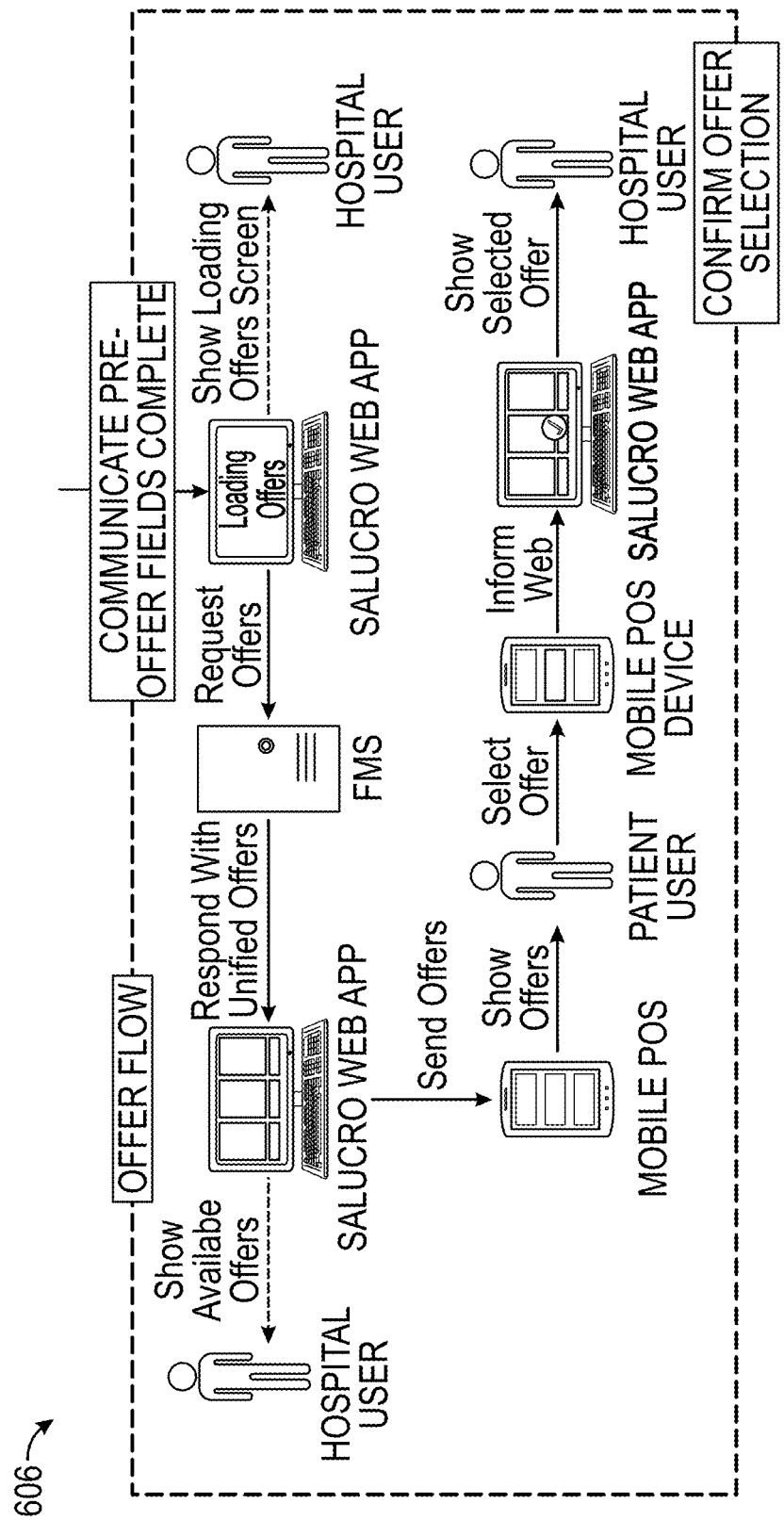
FIG. 6D is a flow diagram illustrating functionality provided by the computing system described herein generating and displaying electronic financing option data, according to aspects of the present inventive concept.
Figure 6E:
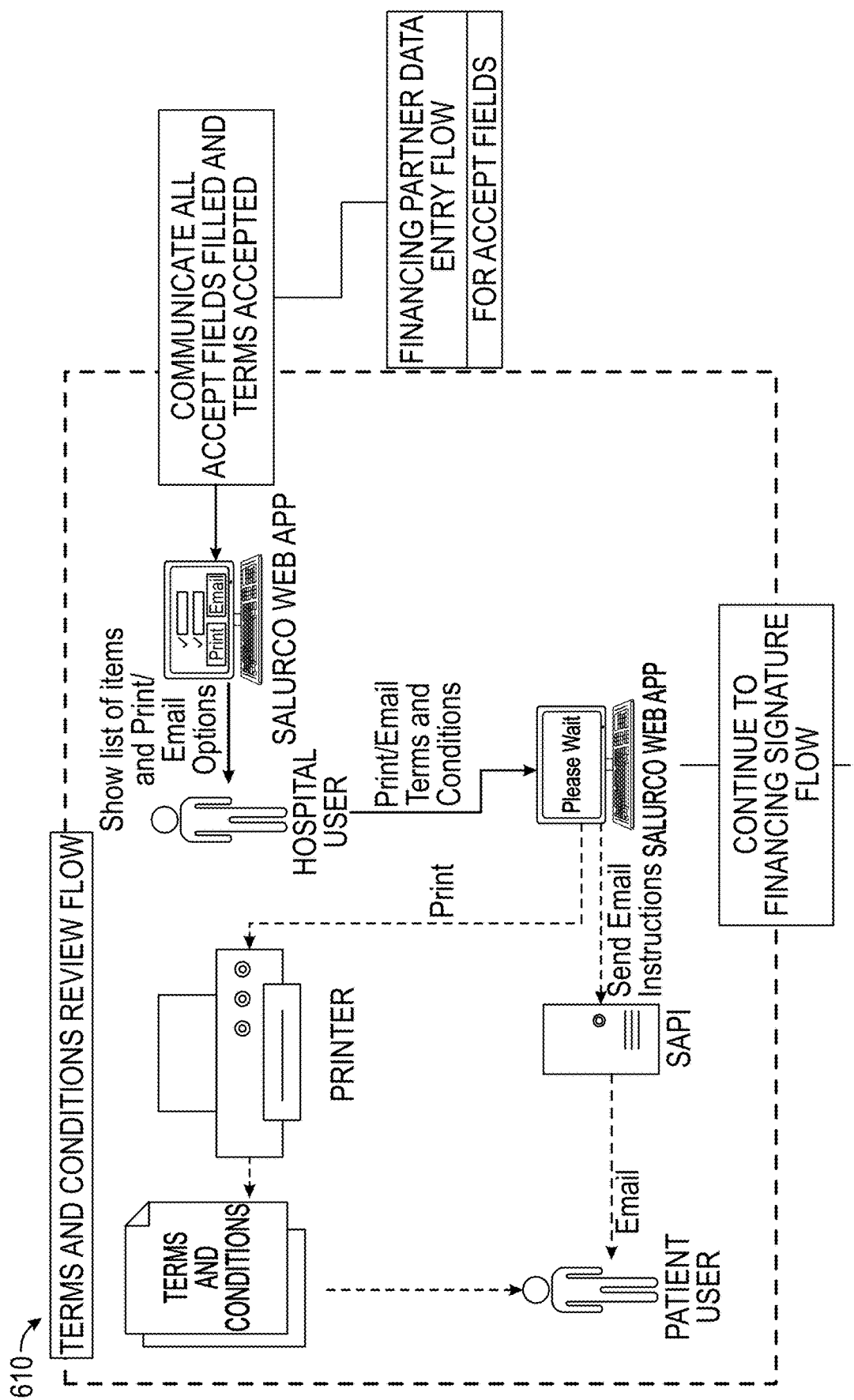
FIG. 6E is a flow diagram illustrating functionality provided by the computing system described herein for processing electronic financing option data, according to aspects of the present inventive concept.
Figure 7A:
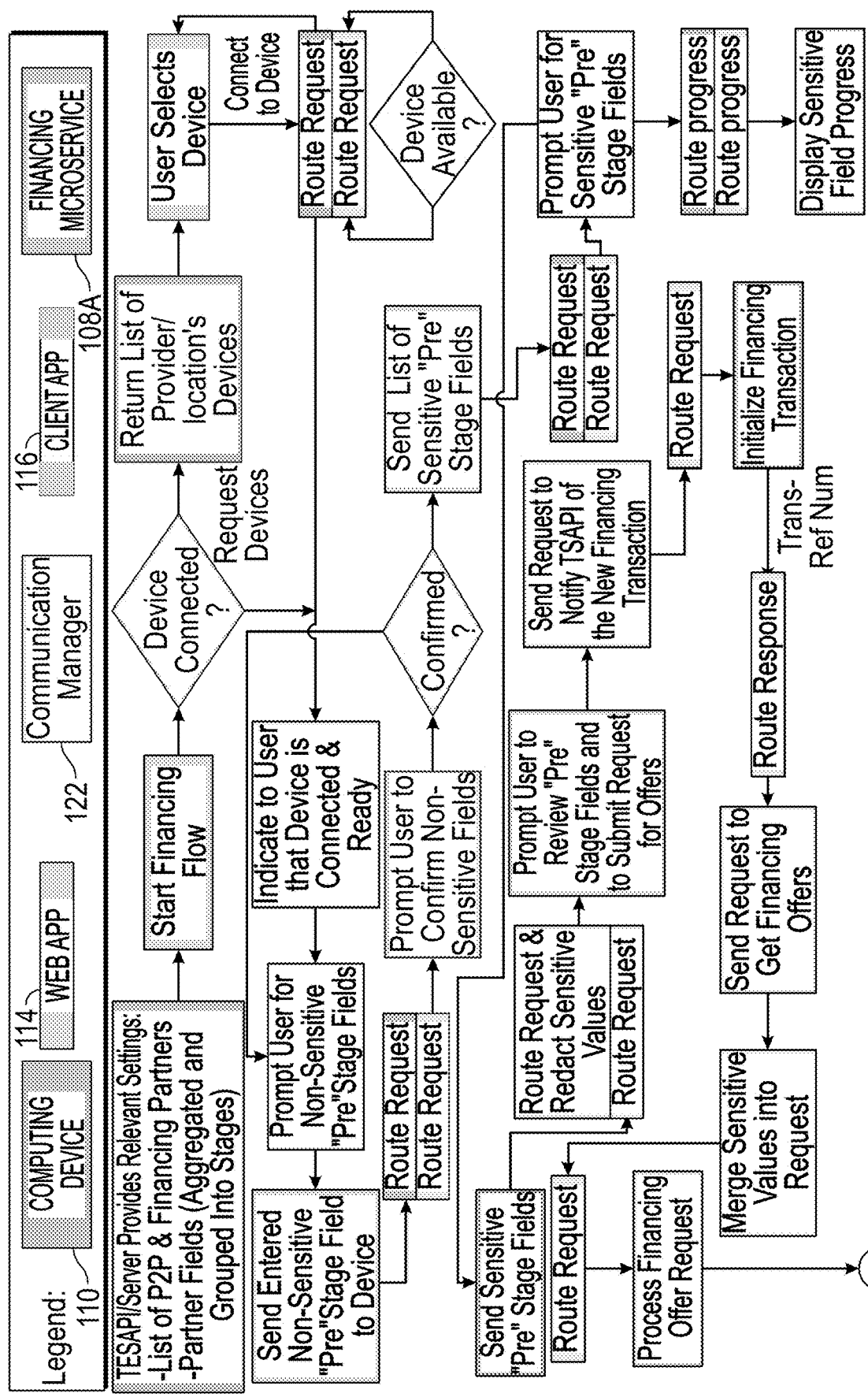
FIG. 7A is a flow diagram illustrating functionality and interactions associated with components of the computing system described herein, according to aspects of the present inventive concept.
Figure 7B:
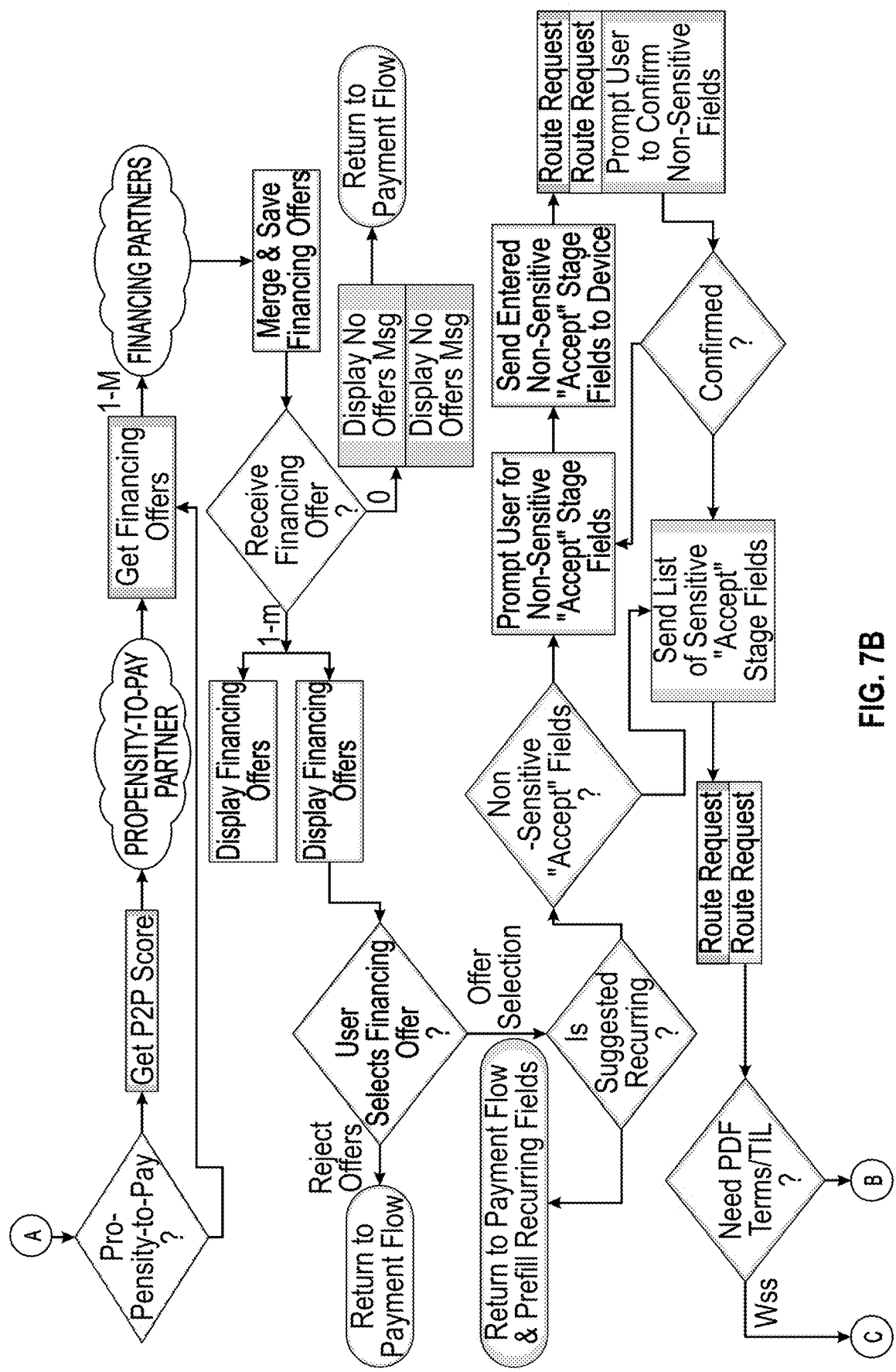
FIG. 7B is a continuation of the flow diagram of FIG. 7A illustrating functionality and interactions associated with components of the computing system described herein, according to aspects of the present inventive concept.
Figure 7C:
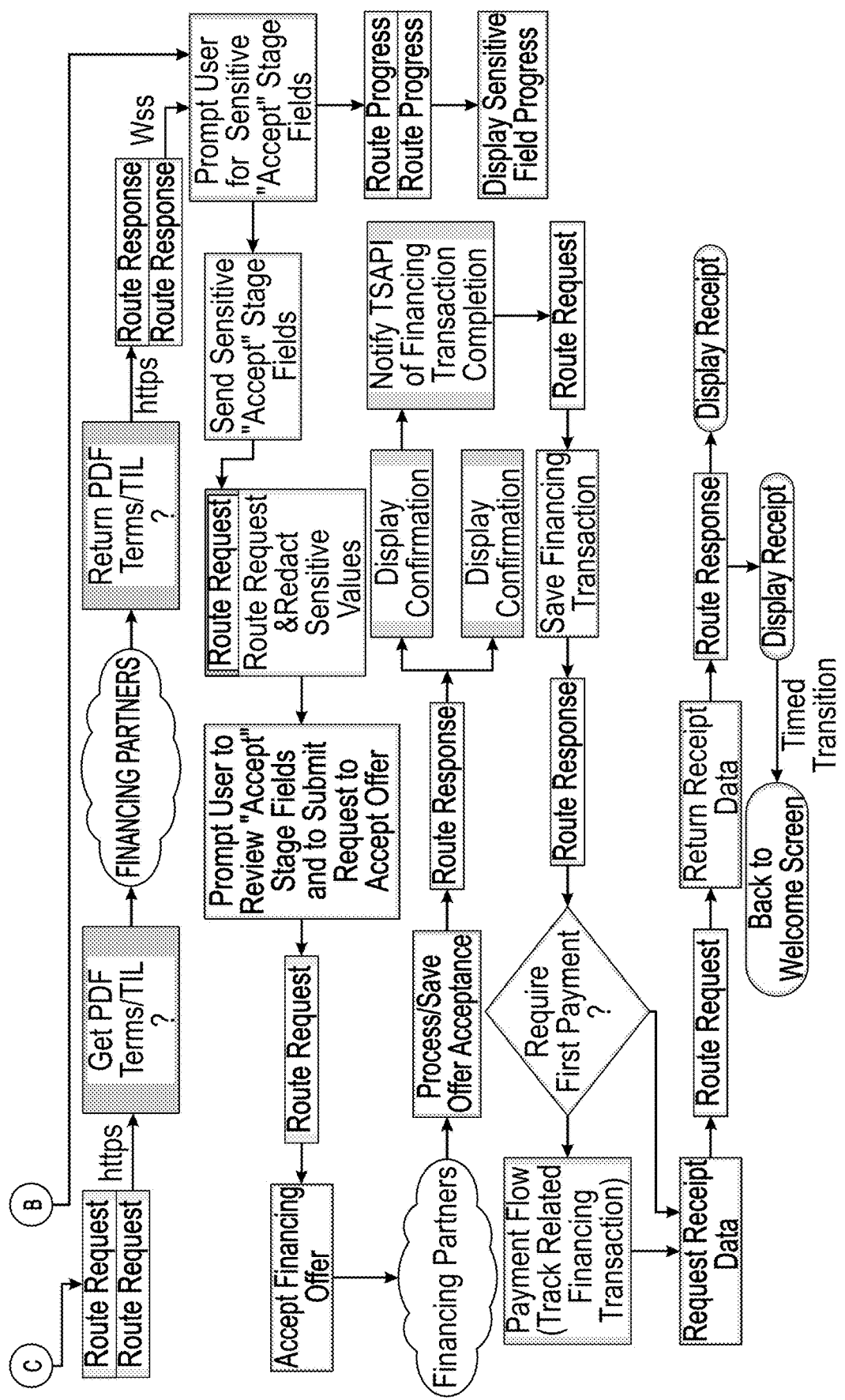
FIG. 7C is a continuation of the flow diagram of FIG. 7A illustrating functionality and interactions associated with components of the computing system described herein, according to aspects of the present inventive concept.
Figure 8:
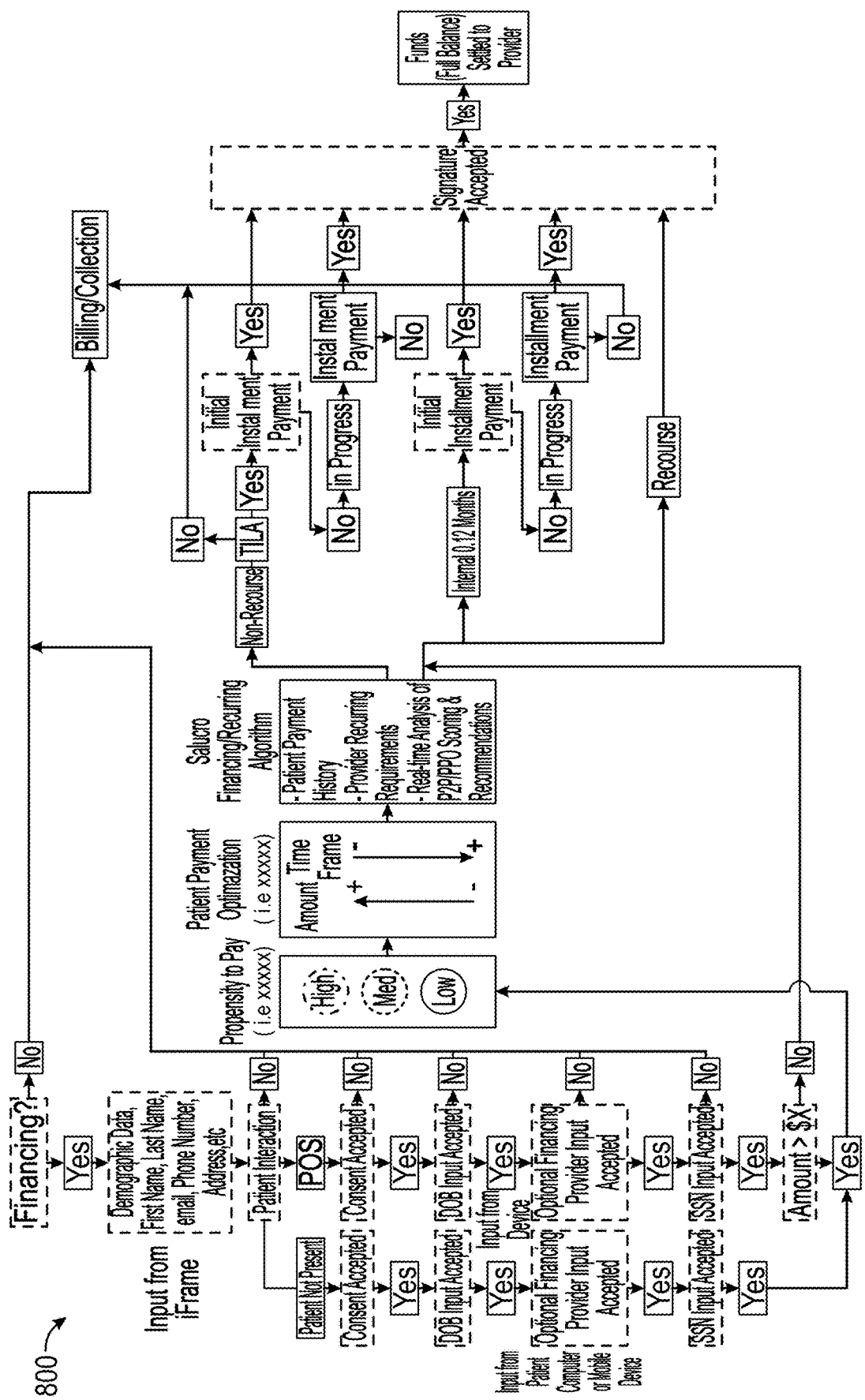
FIG. 8 is a flow diagram illustrating further aspects of the computing system described herein, according to aspects of the present inventive concept.

As reflected in block 304, with reference to block 604 of FIGS. 6A-6F, the patient user 108 may begin to submit input data to the POS device 212 as part of the request for a financing option or otherwise. As shown in FIG. 6C, prior to accepting input data, the patient user 108 may be required to accept certain terms and conditions regarding the submission of information about the patient to the payment platform 102, third parties, or financing partners. Certain terms associated with important healthcare and privacy regulations may be highlighted on the display 215 as desired.

Once terms have been accepted by the patient user 108, one or more fields may be presented to the patient user 108 via the display 215 for input, in order to acquire guarantor information associated with the patient user 108. In some embodiments, the fields may include the patient's social security number, full name, monthly net income, annual gross income, birthdate, and the like. Information provided by the patient user 108 to fill these fields may be packaged as parameters for submission to e.g., financing partners, as further described herein. By dynamically requesting guarantor information associated with a variety of predetermined fields, the payment platform 102 ensures that parameters needed for a variety of different financing partners (to provide financing options) is collected from the patient user 108 all at once. In some embodiments, at this stage, the payment platform 102 utilizes Unified Field data from the financing microservice 108A to synchronize communication with the POS device 212. As further reflected in FIG. 6C and FIGS. 7A-7C, at least some of the guarantor information acquired through the POS device 212 may be scrubbed, masked, redacted, encrypted, or otherwise to protect the patient's information.

Figure 11A:
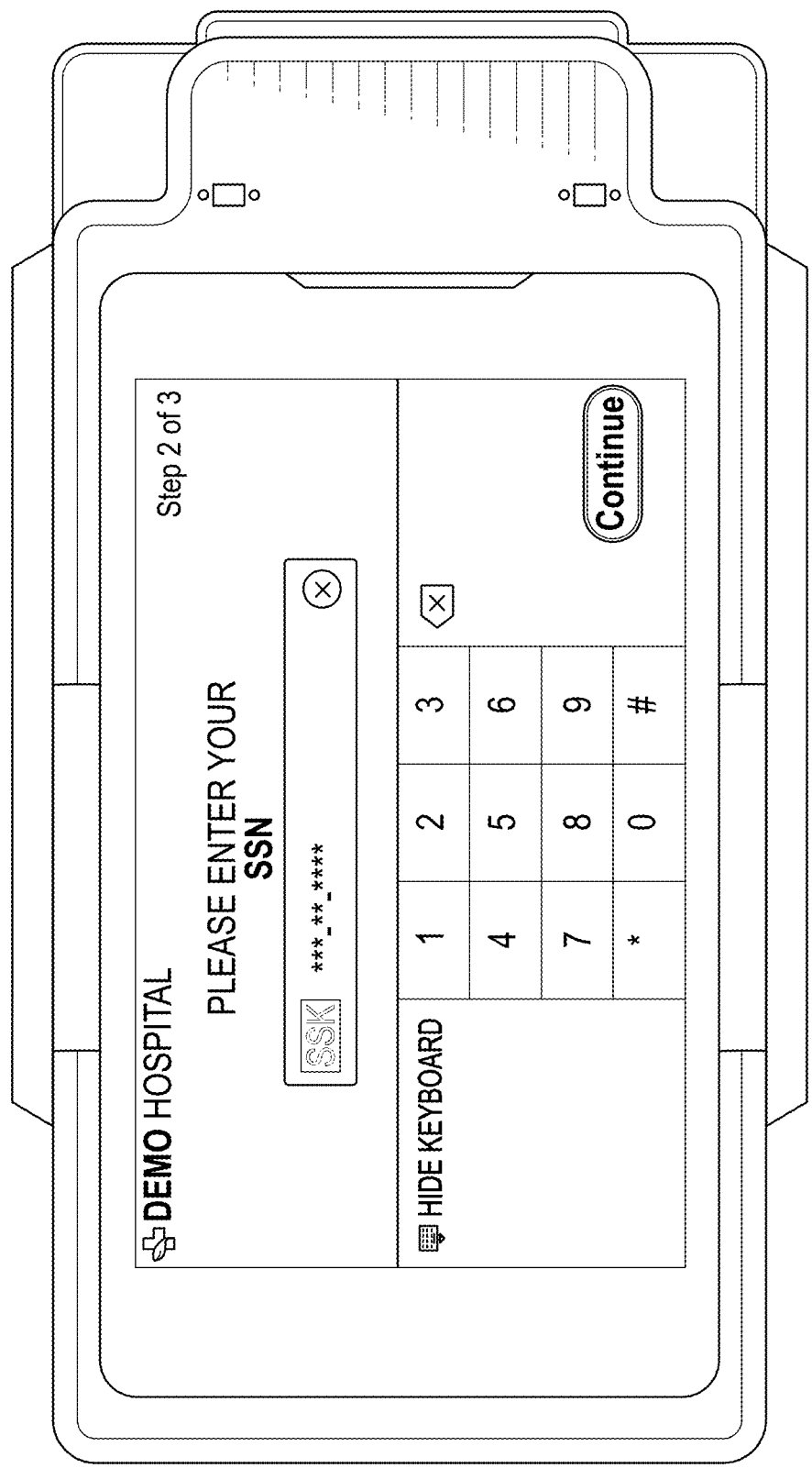
Figure 11B:
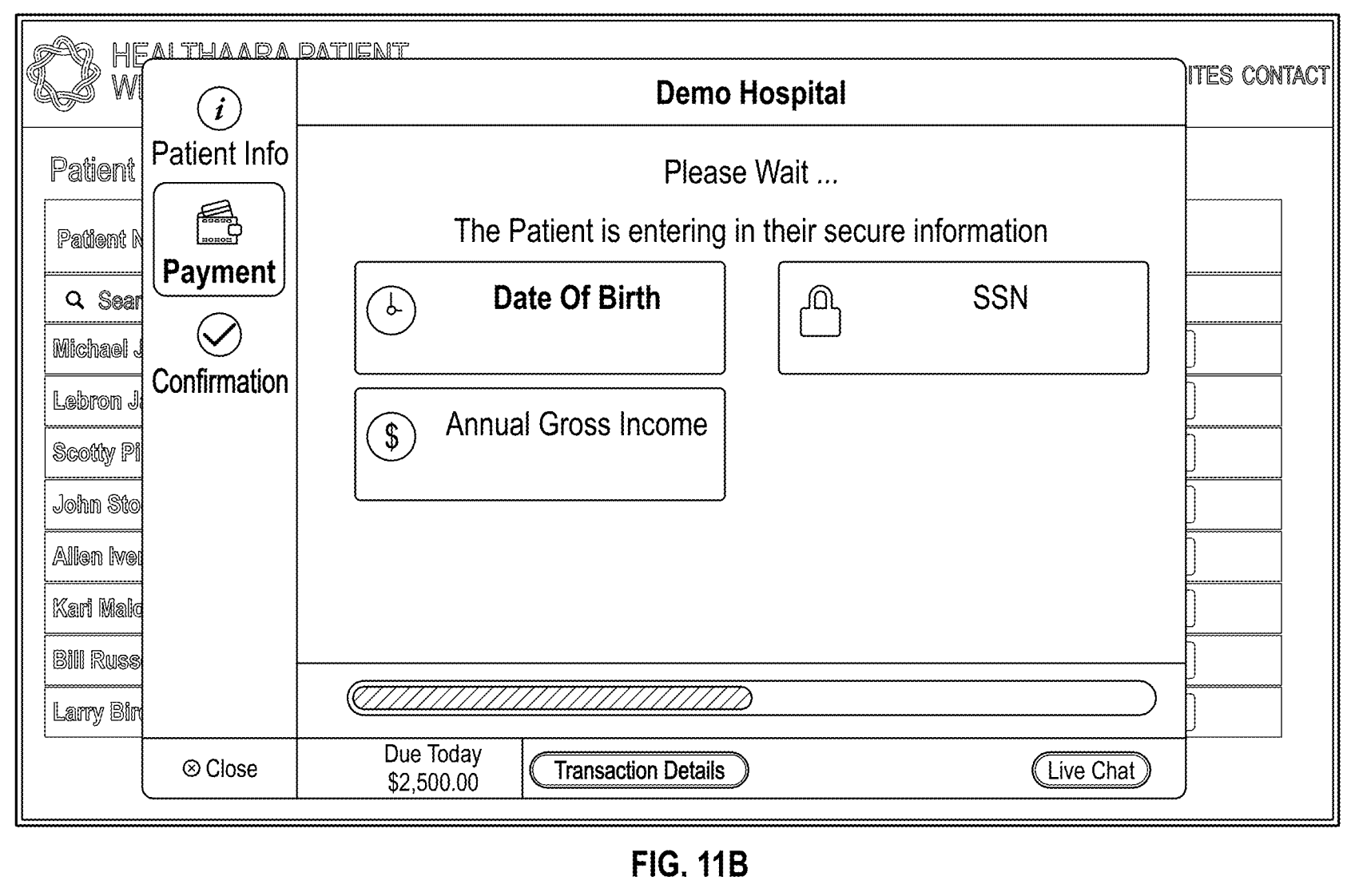
Figure 12A:
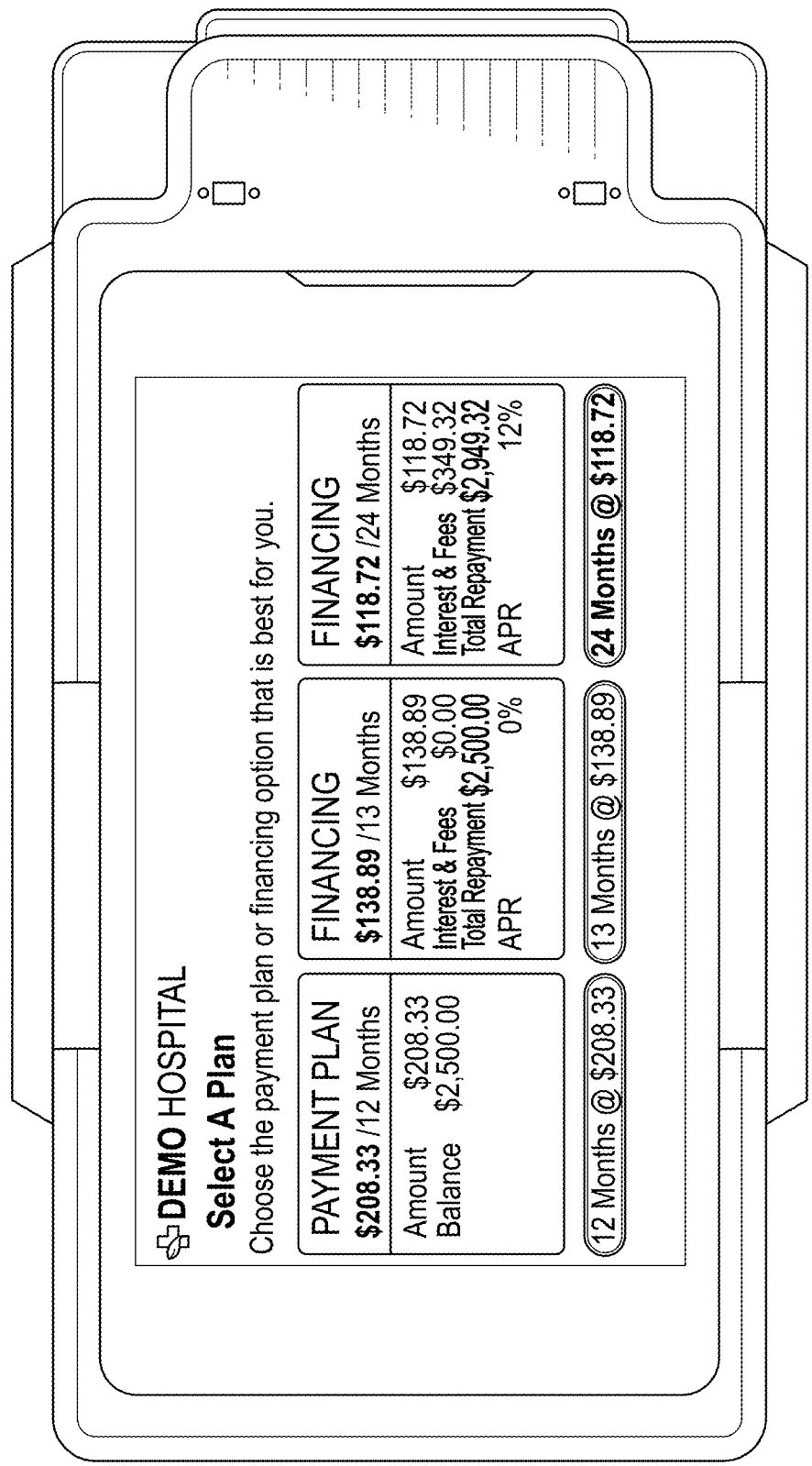
Figure 12B:

As such, in some embodiments, a request for a financing option as described herein may include a plurality of parameter values defined by the fields and associated with the Patient Information, and may be validated by the payment platform 102 using a plurality of predetermined rules, including field-based rules and scripts. Using the predetermined rules and scripts, the payment platform 102 is configured to identify problems associated with the data submitted by a patient or other user and prompt the user to correct the problems via an interface. For example, a request may be submitted with missing, incomplete, or inaccurate data. A field may be missing or the field may include data that is incomplete. The user may be prompted to manually make corrections or additions to the data so that the request for healthcare payment financing can continue processing as described herein. FIGS. 11A-11B illustrate the aforementioned data input.

As reflected in block 306, the payment platform 102 is further operable to translate, convert, transform, modify, or otherwise package the data acquired to a format or set of parameters compatible with APIs, interfaces, or other entry points of the integrated service provider system 118. For example, APIs of the integrated service provider system 118 may require that information submitted in API calls be in a certain format or be otherwise arranged in a specific form and populate certain fields. Accordingly, in some embodiments, the payment platform 102 may execute one or more functions to normalize or format the data or generate a digital file that is suitable for access by the integrated service provider system 118. In some embodiments, this step may be omitted or optional where the healthcare provider has propensity-to-pay integration or otherwise has access to financial history or financial behavior of a patient, e.g., the healthcare provider has access to information about the patient's ability to pay the healthcare bill, the patient's credit history, or any such information that is helpful for analyzing the patient's ability to pay down a healthcare balance.

At block 308, once the patient data is packaged or otherwise prepared for the integrated service provider system 118 as described, the data may be transmitted to the integrated service provider system 118 to generate a propensity-to-pay score or other value, or some form of a credit score or indicator as to the patient's financial history or behavior. A propensity-to-pay score may define various levels, for example, high, medium, or low levels associated with propensity of the patient to pay the balance due as demonstrated in FIG. 8. In other embodiments, the integrated service provider system 118 may provide other financial data or related information useful for analyzing the financial behavior of the patient. For example, the integrated service provider system 118 may simply provide a credit score, a credit report, or any other type of information that may be utilized by the financing partner systems 120 (or a healthcare provider) to determine whether the patient should be offered one or more financing options for the healthcare bill.

At block 310, the payment platform 102 may implement predetermined logic and/or an optimization algorithm (not shown) that uses the propensity-to-pay score or other financial information about the patient, patient balance, provider customizations, and other relevant billing data to generate a set of best-fit financing options personalized or tailored for the patient. For example, the healthcare provider 132 may provide internal financing for a patient that has at least a medium level of a propensity-to-pay score and the balance owed by the patient does not exceed a particular amount. In this case, the patient may select internal financing with the healthcare provider 132, and the computing platform 102 can set up an account with the healthcare provider 132, set up payment schedules and payment gateways 134, and facilitate payments by the patient to the healthcare provider 132. As another example, the algorithm may generate a list or digital report indicating that financing options from the first financing partner system 120A and the second financing partner system 120B are available to the patient user 108, but may optionally suggest that the patient user 108 select the financing option from the first financing partner system 120A (which may be determined to be more favorable to the individual patient based on the patient's information and financial history).

At block 310, assuming internal financing is not available for whatever reason, the data associated with the propensity-to-pay value and the data associated with the guarantor Information may be translated, transformed, converted to a format compatible with the financing partner systems 120, or simply packaged as parameters suitable for transmission to the financing partner systems 120. Specifically, similar to block 306, the payment platform 102 may generate a digital file that is suitable for access by the financing partner systems 120. For example, a digital file may be generated that is suitable or compatible with API calls associated with APIs of the financing partner systems 120 to retrieve possible financing options based on the guarantor information and propensity-to-pay score. Where necessary, the payment platform 102, via the client application 116, may prompt the patient for any additional information needed by the financing partner systems 120.

At block 312, the computing platform 102 may transmit the balance, through one or more API calls or otherwise, the guarantor and/or Patient Information, and any value or values associated with the propensity-to-pay score, translated and/or packaged as described, to one or more of the financing partner systems 120. The financing partner systems 120 may return financing options to the payment platform 102. In some embodiments, the financing partner systems 120 may return zero financing options, e.g., in the case where the patient has a low propensity-to-pay score, and the payment platform 102 may notify the patient in this regard. In either case, the financing microservice 108A as described herein manages the back and forth communications between the client application 116, the computing platform 102, the integrated service provider system 118, and the financing partner systems 120 and enables extended communication sessions so that the patient can access information about possible financing options for the bill as quickly and efficiently as possible. In other words, the financing microservice 108A keeps certain communications and applications open until the healthcare bill is paid. In some embodiments, the financing microservice 108 establishes a secure channel over a websocket connection to enable communications between the POS device 212 and other devices of the computing system 100.

At block 314, the client application 116 may display a list of financing options from financing partner systems 120 via the display 215 of the POS device 212. In some embodiments, the list may be filtered or limited in accordance with additional rules of the healthcare provider 132. For example, the healthcare provider 132 may require that financing options be limited to options that require a payoff of the balance within a certain predefined time period. Further, as reflected by FIG. 6D, the patient user 108 may consider the available financing options for the balance and select an option if desired using the client application 116 and the POS device 212. As reflected by FIG. 6E, additional terms and conditions may be displayed to the patient user 108 via the display 215 for the patient's review and consideration. In some embodiments, selection of a financing option by the user does not result in a transaction with a financing system until the patient agrees to the terms and conditions and provides a digital signature, as further described herein. The functionality of block 314 is further illustrated by FIGS. 12A-12B.

Figure 13A:
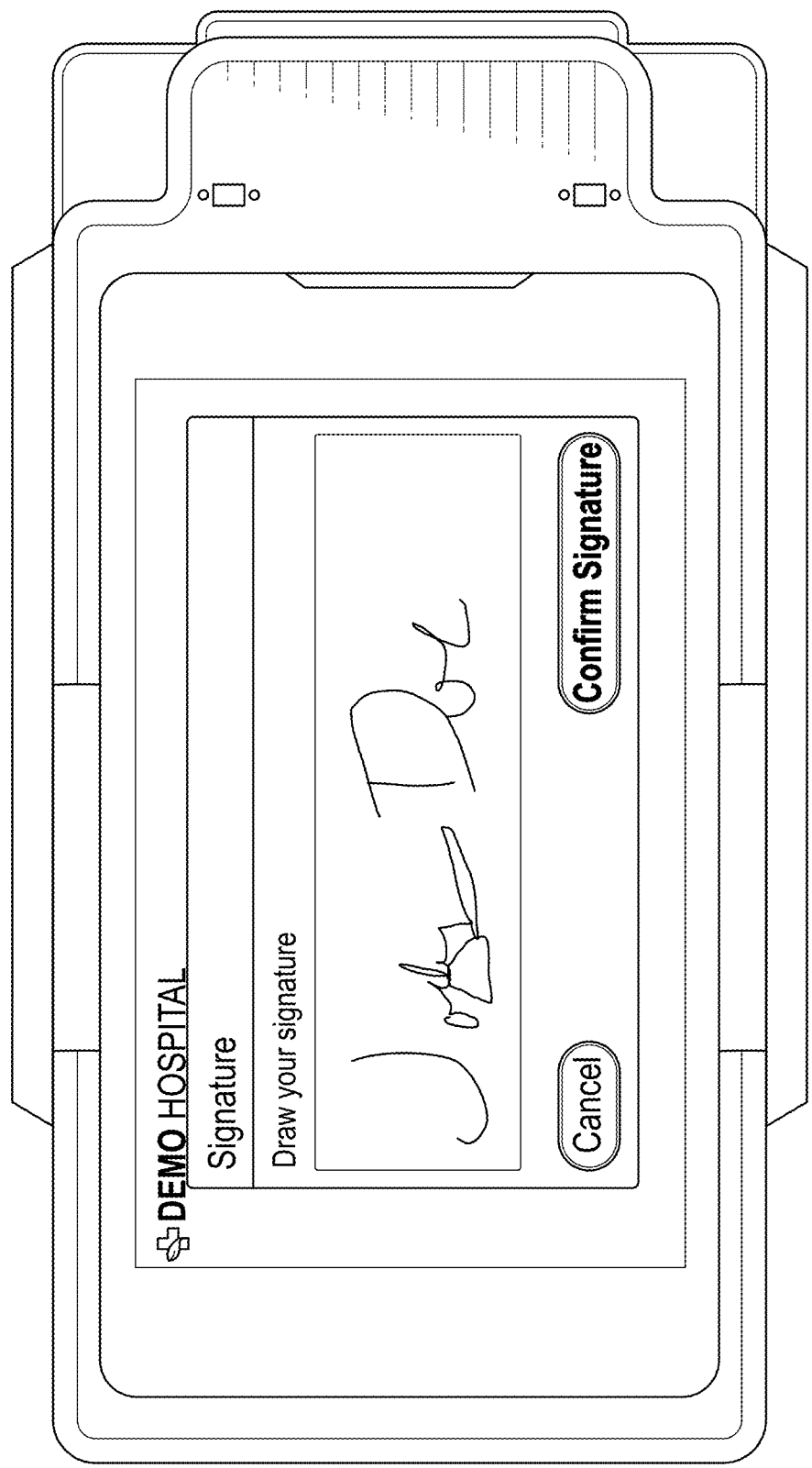
Figure 13B:
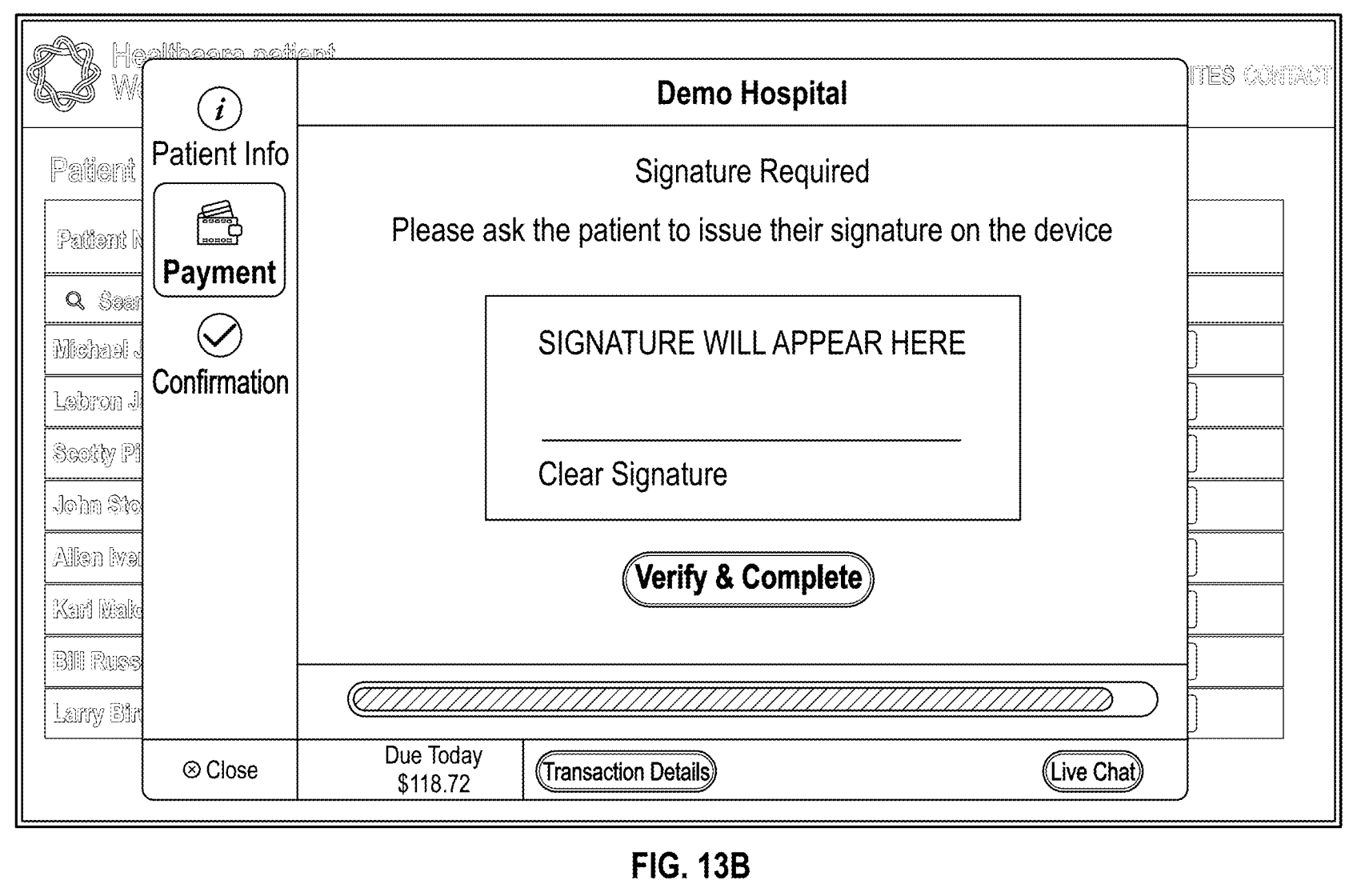

Referring to block 316 and FIG. 6F, after the patient has the opportunity to review, print, and email the terms and conditions associated with a selecting financing option, they may be presented with a prompt via the display 215 for their signature. The patient user 108 may then use their finger or stylus pen to input their signature to the POS device 212. The device can encode the signature or other consent mechanism into data files for purposes of compliance with electronic signature laws, such as the Electronic Signatures in Global and National Commerce Act. The device can also encode the signature into "Portable Network Graphics" (PNG) format, a lossless (100% accurate) compressed image format suitable for network transfer to one of the financing partner systems 120 offering the selected financing option. Input of the digital signature is illustrated in FIGS. 13A-13B.

The payment platform 102 may then facilitate the transmission as necessary of any additional information from the patient to the financing partner systems 120 to prepare for an electronic payment transaction associated with the selected financing option. Confirmation may then be submitted to the patient via the client application 116. In some embodiments, the payment platform 102 may thereafter collect and process payments on behalf of the financing partner systems 120. Alternatively, the patient may be directed to external systems to work directly with the financing partner systems 120 to satisfy the financing option selected.

Figure 5B:
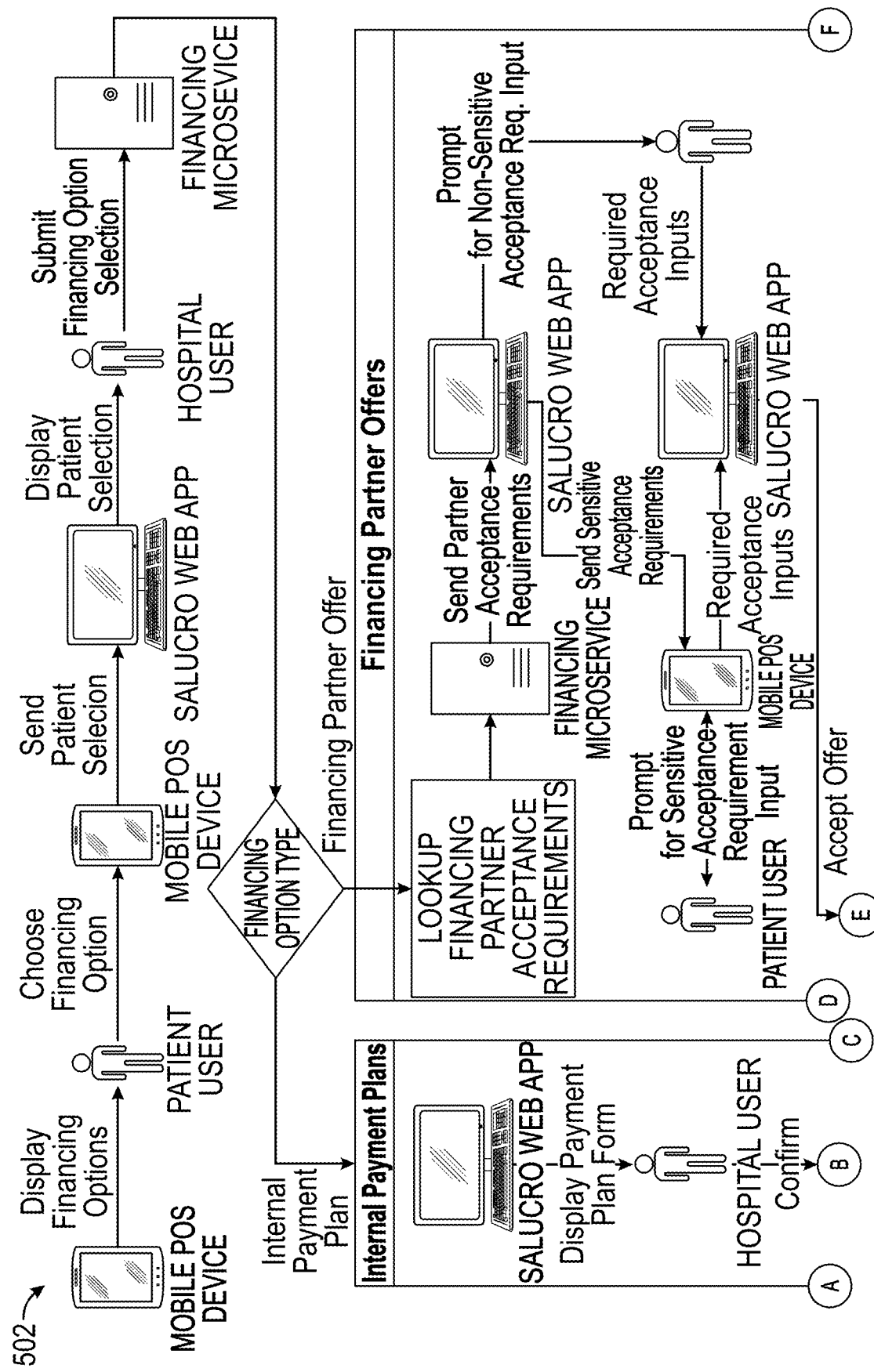
FIG. 5B is a diagram illustrating additional logic and/or functionality associated with possible interactions between various possible components of the computing system for processing electronic payments associated with healthcare as described herein, according to aspects of the present inventive concept.
Figure 5C:
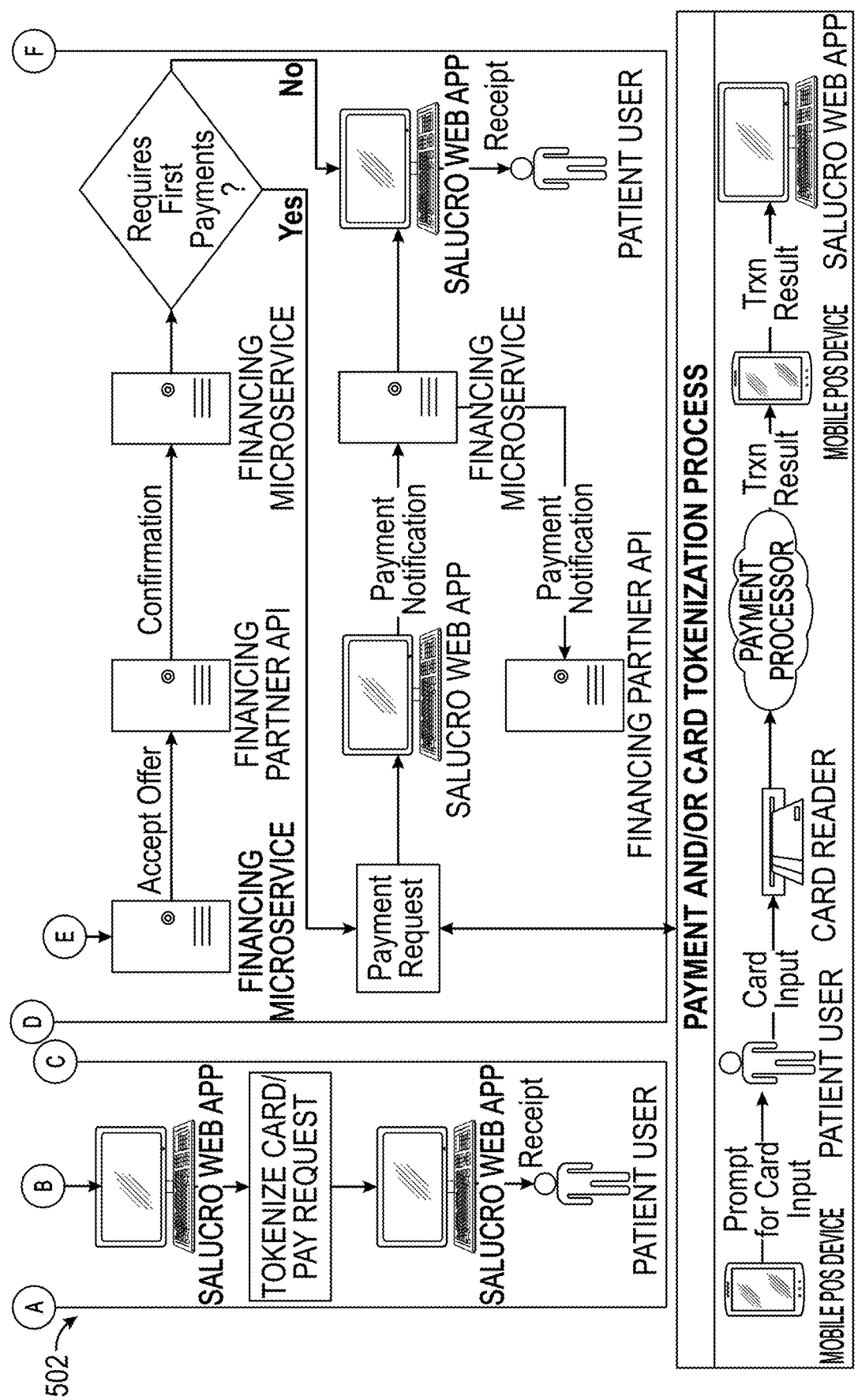
FIG. 5C is a diagram illustrating additional logic and/or functionality associated with possible interactions between various possible components of the computing system for processing electronic payments associated with healthcare as described herein, according to aspects of the present inventive concept.
Figure 14A:
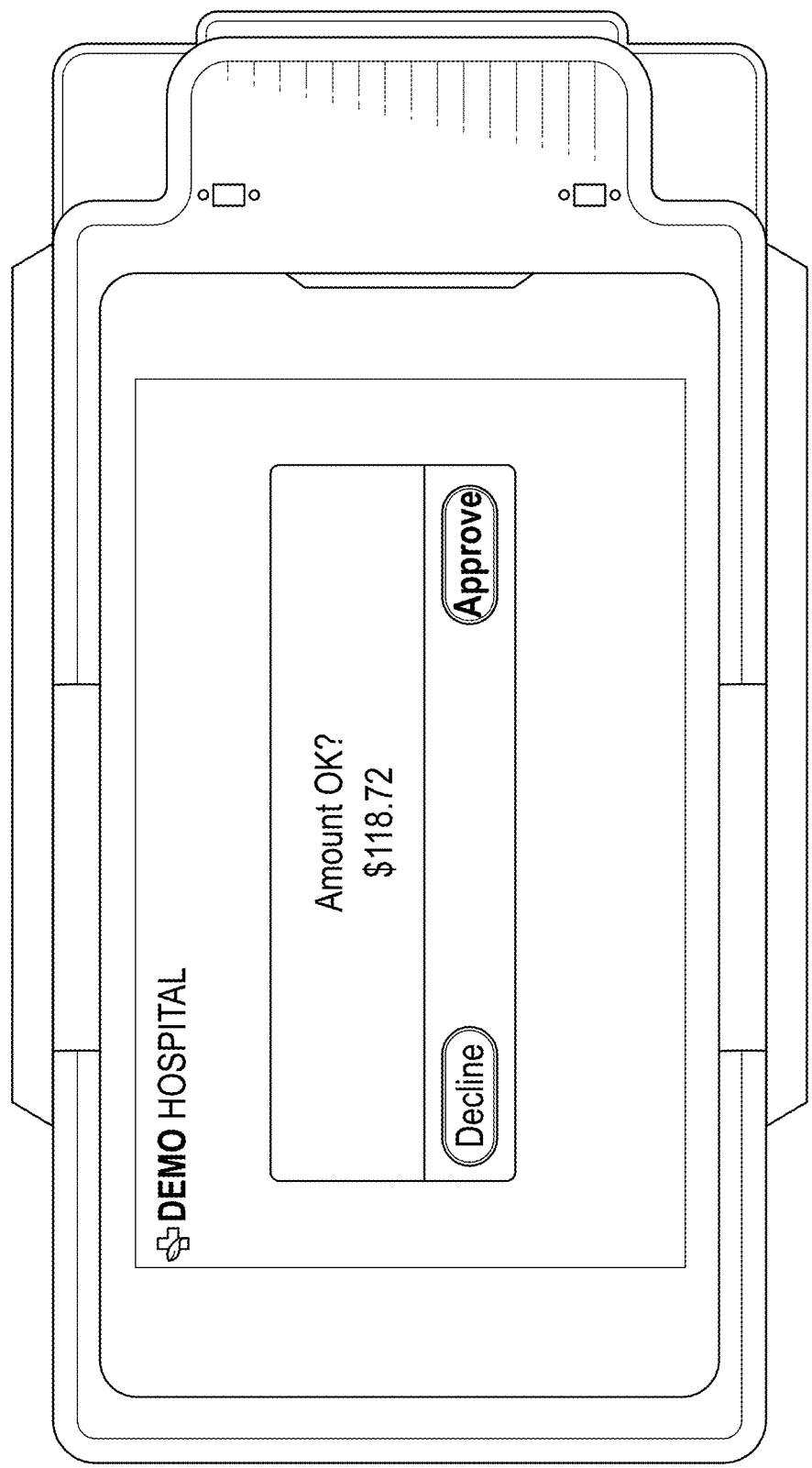
Figure 14B:
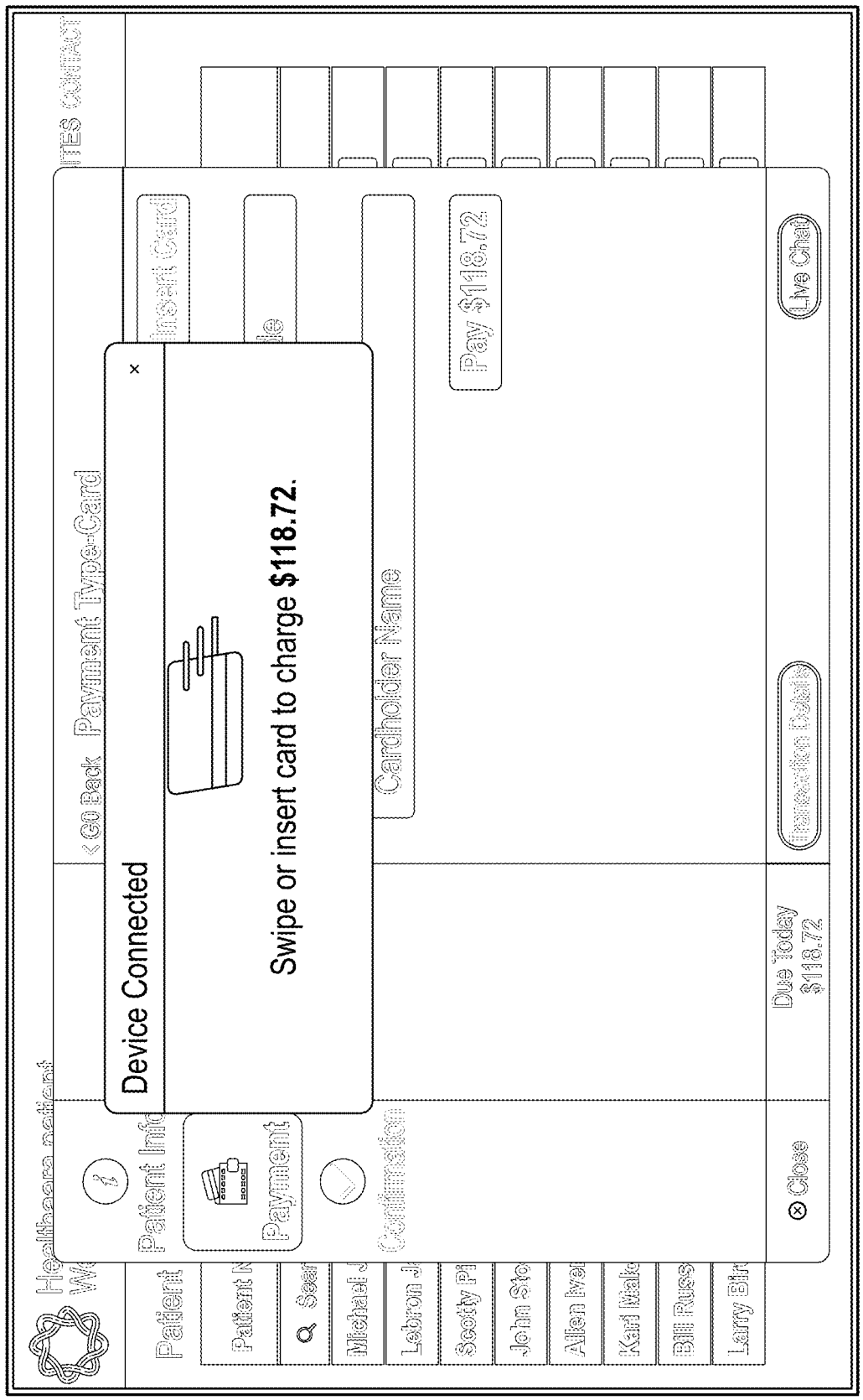

Referring to block 318 and FIGS. 5B-5C, once the patient user 108 has electronically accepted and agreed to a financing option as described herein, the patient may process a first electronic payment transaction corresponding to the selected financing option using the payment card reader 220 of the POS device 212. In some embodiments, the payment platform 102 may require an initial payment as part of agreeing to the financing option selected. The web application 114 of the payment platform 102 may track this payment and/or future payments, or the patient user 108 may be required to interact with the financing partner system 120 associated with the selected financing option for future payments. FIGS. 14A-14B illustrate an exemplary electronic payment transaction as described.

Figure 4:
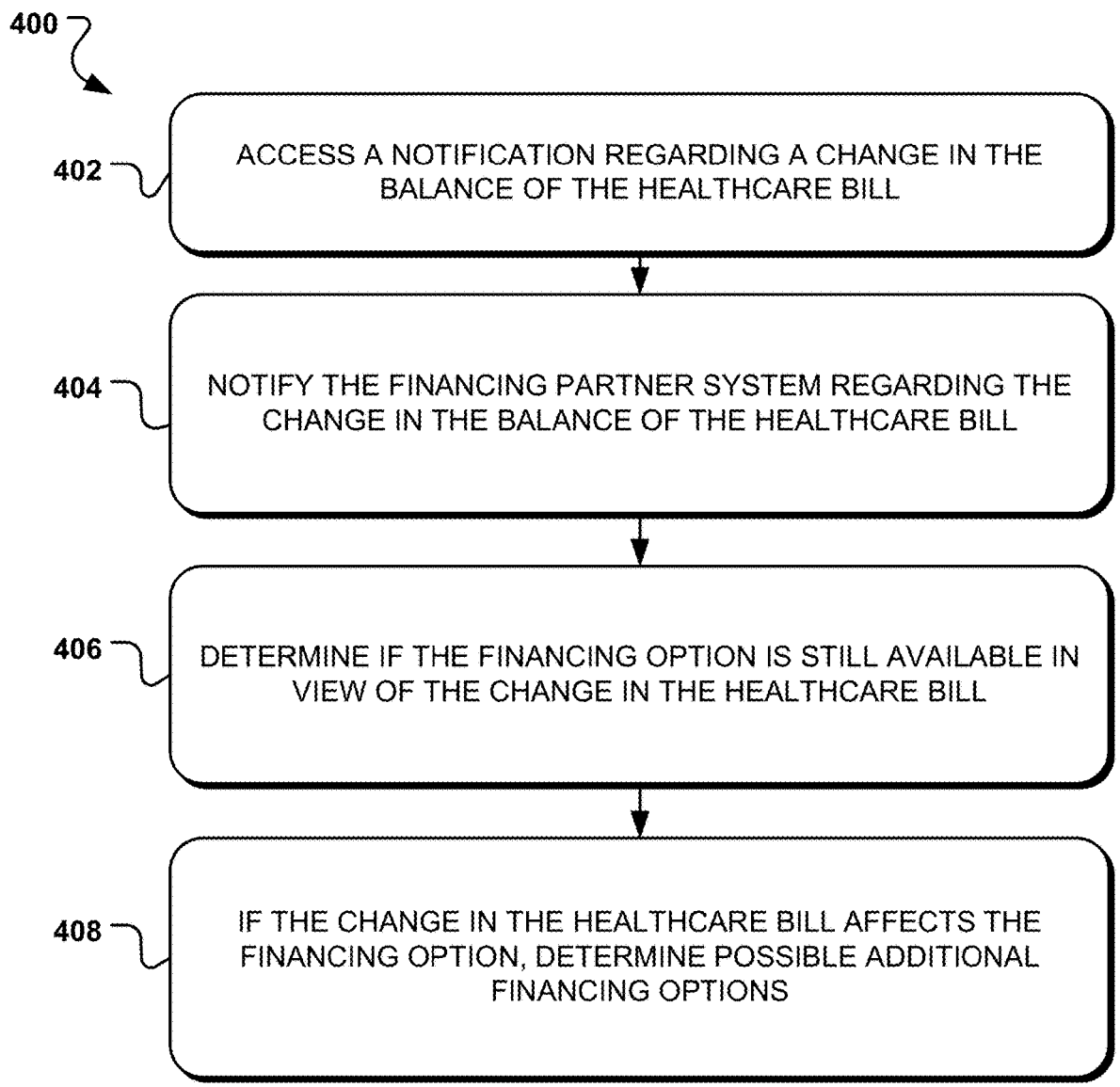
FIG. 4 is an exemplary process flow for implementing aspects of the computing system for processing electronic payments associated with healthcare described herein, according to aspects of the present inventive concept.

Referring to FIG. 4, additional aspects of the computing system 100 may be described with reference to the process flow 400. Utilizing the financing microservice 108A and the communication management service 122, the payment platform 102 may maintain communication with the healthcare provider 132, the integrated service provider system 118, and the financing partner systems 120 as needed to address changes to the balance of the healthcare bill owed by the patient. As reflected at block 402, a change in the balance of the healthcare bill due to the patient may occur as a result of changing insurance coverage, claim coverage, or reasons. In any case, this change may affect the terms or availability of the financing option originally selected by the patient user 108.

The revised balance may be assessed against any parameters established by the financing partner or the healthcare provider 132 and if the revised balance is still consistent with the parameters and consent of the patient, then the computing platform 102 may communicate with the financing partner systems 120 at block 404 to issue an update regarding the change in the balance. The computing platform 102 may also notify other parties and systems as needed. At block 406, the computing platform 102 may communicate with the financing partner system 120 to determine if the financing option is still available in light of the change in the healthcare bill balance, or whether an adjustment can and may be made to the financing option.

At block 408, if the change in the balance terminates the financing option for whatever reason, the patient may be prompted to engage the client application 116 to re-start the process described in FIG. 3 and make an attempt to obtain an alternative financing option or the healthcare provider will engage the patient for further options.

While the aforementioned steps of FIGS. 3 and 4 are described primarily with reference to the POS device 212, in other embodiments, the payment device 112 may be implemented. In these other embodiments, the client application 116 may be executed by the payment device 112 as a mobile application, such as an Android application or 105 application. Alternatively, the client application 116 may be accessible via an Internet browser executed by a desktop computer or laptop. In yet other embodiments, the functionality set forth in FIGS. 3 and 4 may be provided where the payment device 112 is operated by a healthcare provider or administrator user 106 as defined herein. In this embodiment, a patient may call, or chat with the administrator user 106 and the administrator user 106 may utilize the device 112 to generate the financing options for the patient using the payment platform 102 described herein.

Figure 9:
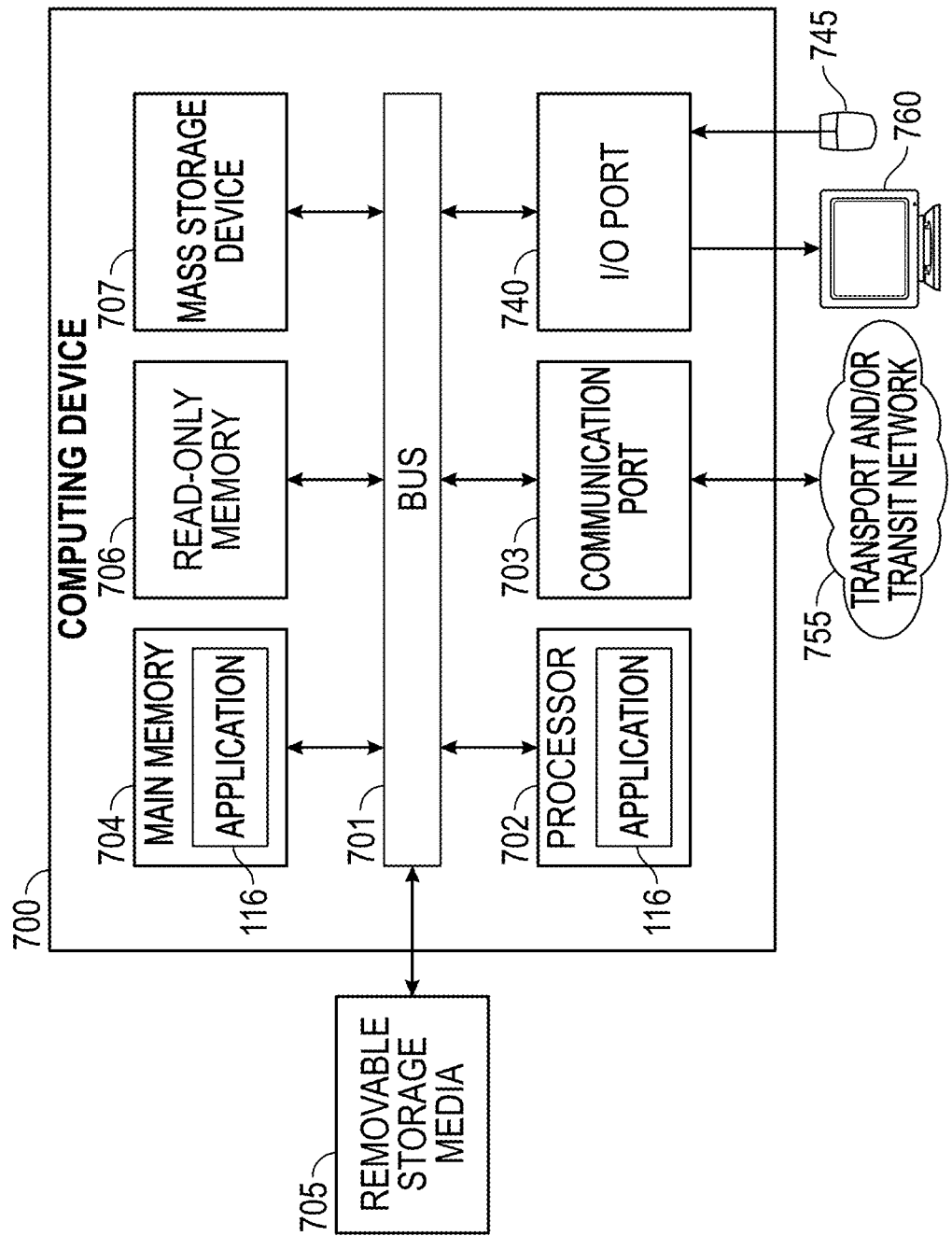
FIG. 9 illustrates an example of a computing device that may deployed to implement various services, systems, and methods discussed herein, according to aspects of the present inventive concept.
Figure 10:
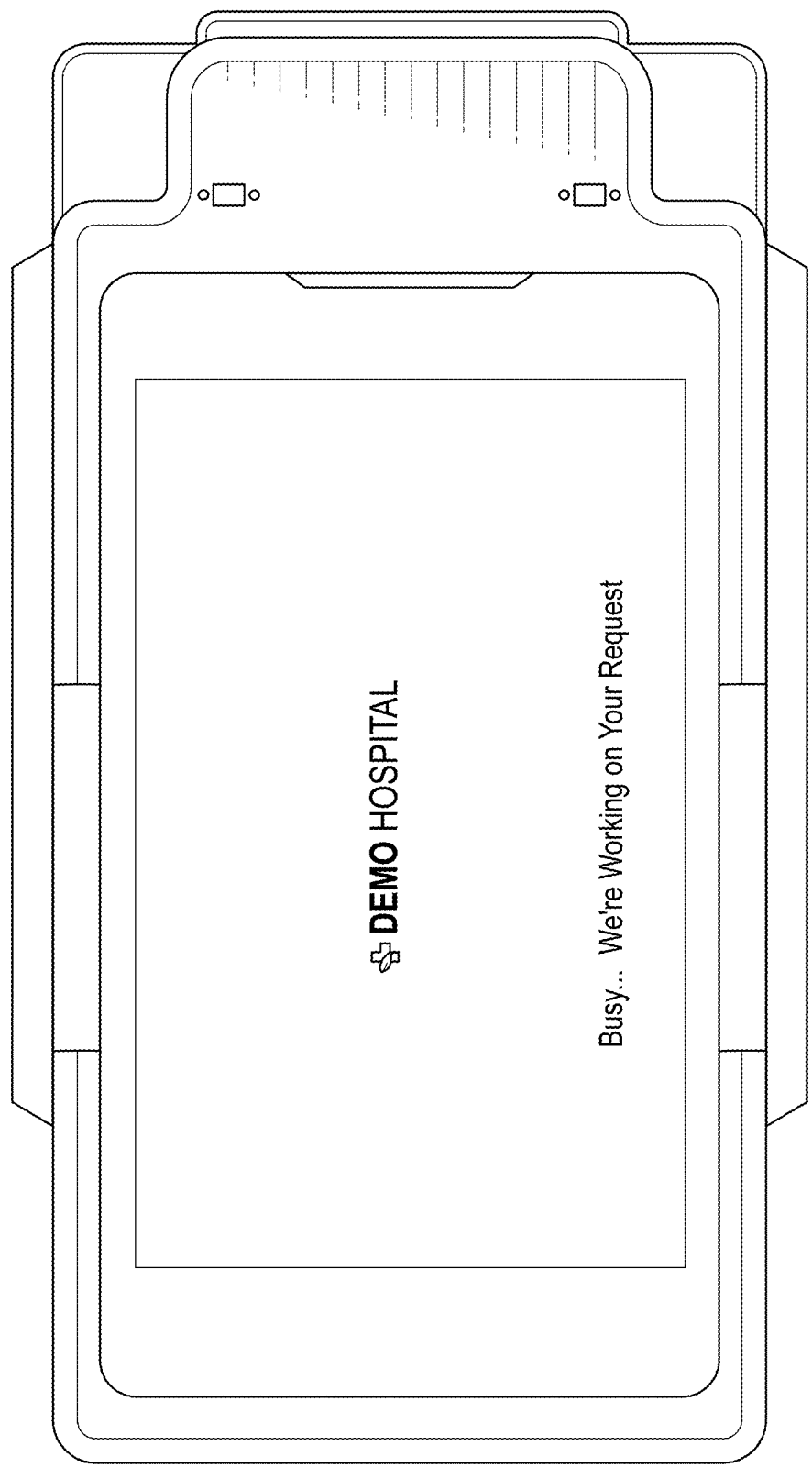
FIGS. 10-14B are various screenshots illustrating physical outputs generated by the system described herein, according to aspects of the present inventive concept.

FIG. 9 is an example schematic diagram of a computing device 700 that may implement various methodologies discussed herein. For example, the computing device 700 may comprise a POS device deployed to execute the client application 116. The computing device 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer device 700 connects. Computing device may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with the client application 116 that supports functionality of the payment platform 102 discussed above. In other words, aspects of the client application 116 and/or payment platform 102 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret or otherwise perform processes, such as through logic instructions, executing on the processor 702 and based on the client application 116 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Referring to FIGS. 10A-10E, the depicted screenshots illustrate the physical transformation of the patient data to a plurality of possible healthcare financing options. The patient user 108 may then select one or more of the financing options, confirm the selection and understanding as to terms of use or otherwise, and may further process an electronic payment transaction.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
   receiving, by a payment platform, input data associated with a completed healthcare service already provided to a patient, the input data having a first format;
   translating, by the payment platform, the input data into a second format compatible with a provider system having financing credit history data associated with the patient;

retrieving, by the payment platform and from the provider system, using the translated input data, the financing credit history data;

translating, by the payment platform, the financing credit history data into a third format compatible with a plurality of third party financing partner systems;

generating, by the payment platform and in a user interface, a plurality of financing options from the plurality of third party financing partner systems for one or more of the plurality of third party financing partner systems to pay for an existing and known amount of a healthcare bill that is currently owed for the completed healthcare service already provided to the patient, wherein the patient is obligated to pay back the known amount of the healthcare bill over time to the one or more of the plurality of third party financing partner systems, and wherein the plurality of financing options are based on the translated financing credit history data;

receiving, by the payment platform, a selection from the user interface of the one or more of the plurality of third party financing partner systems; and establishing, by the payment platform, a communication channel between the user interface and the one or more of the plurality of third party financing partner systems.

2. The method of claim 1, wherein:
the financing credit history data includes propensity-to-pay information for the patient; and
the generating is further based on the propensity-to-pay information.

3. The method of claim 1, further comprising:
identifying a change in a balance of the healthcare bill; and
communicating the change to the plurality of third party financing partner systems to determine a possible change in the plurality of financing options.

4. The method of claim 1, wherein the retrieving the financing credit history data comprises calling a first application programming interface (API) that utilizes the translated input data to retrieve the financing credit history data.

5. The method of claim 1, wherein the first format is not compatible with the provider system, and the second format is not compatible with the plurality of third party financing partner systems.

6. The method of claim 1, further comprising:
receiving a selection by the patient of one of the financing options; and
processing an electronic payment as a first payment of multiple payments of a payment plan defined by the selection and resolving at least a portion of the healthcare bill.

7. The method of claim 1, wherein the generating comprises applying an algorithm.

8. The method of claim 1, further comprising:
retrieving from at least some of the third party financing partner systems, using the translated financing credit history data, a plurality of financing offers; and
further generating, using the plurality of financing offers, additional financing options for payment of a healthcare bill for the patient.

9. The method of claim 8, wherein the retrieving the translated financing credit history data comprises calling a second application programming interface (API) that utilizes the translated financing credit history data to retrieve the financing options.

10. The method of claim 1, further comprising providing the plurality of financing options on at least one of a smartphone, laptop or computer.

11. The method of claim 1, wherein one or more of the plurality of financing options include a payment plan offered by the provider system.

12. A system comprising:
a processor in communication with a payment platform; and
a tangible, non-transitory memory configured to communicate with the processor,
the tangible, non-transitory memory having instructions stored thereon that, in response to execution by the processor, cause the processor to perform operations comprising:
receiving, by the payment platform, input data associated with a completed healthcare service already provided to a patient, the input data having a first format;
translating, by the payment platform, the input data into a second format compatible with a provider system having financing credit history data associated with the patient;
retrieving, by the payment platform and from the provider system, using the translated input data, the financing credit history data;
translating, by the payment platform, the financing credit history data into a third format compatible with a plurality of third party financing partner systems;
generating, by the payment platform and in a user interface, a plurality of financing options from the plurality of third party financing partner systems for one or more of the plurality of third party financing partner systems to pay for an existing and known amount of a healthcare bill that is currently owed for the completed healthcare service already provided to the patient, wherein the patient is obligated to pay back the known amount of the healthcare bill over time to the one or more of the plurality of third party financing partner systems, and wherein the plurality of financing options are based on the translated financing credit history data;
receiving, by the payment platform, a selection from the user interface of the one or more of the plurality of third party financing partner systems; and
establishing, by the payment platform, a communication channel between the user interface and the one or more of the plurality of third party financing partner systems.

13. The system of claim 12, wherein:
the financing credit history data includes propensity-to-pay information for the patient; and
the generating is further based on the propensity-to-pay information.

14. The system of claim 12, further comprising:
identifying a change in a balance of the healthcare bill; and
communicating the change to the plurality of third party financing partner systems to determine a possible change in the plurality of financing options.

15. The system of claim 12, further comprising:
receiving a selection by the patient of one of the financing options; and
processing an electronic payment as a first payment of multiple payments of a payment plan defined by the selection and resolving at least a portion of the healthcare bill.

16. The system of claim 12, wherein the generating comprises applying an algorithm.

17. The system of claim 12, wherein the first format is not compatible with the provider system, and the second format is not compatible with the plurality of third party financing partner systems.

18. The system of claim 12, further comprising:
retrieving from at least some of the third party financing partner systems, using the translated financing credit history data, a plurality of financing offers; and
further generating, using the plurality of financing offers, additional financing options for payment of a healthcare bill for the patient.

19. The system of claim 12, further comprising providing the plurality of financing options on at least one of a smartphone, laptop or computer.

20. An article of manufacture including a non-transitory, tangible computer readable storage medium having instructions stored thereon that, in response to execution by a processor in communication with a payment platform, cause the processor to perform operations comprising:
receiving, by the payment platform, input data associated with a completed healthcare service already provided to a patient, the input data having a first format;
translating, by the payment platform, the input data into a second format compatible with a provider system having financing credit history data associated with the patient;
retrieving, by the payment platform and from the provider system, using the translated input data, the financing credit history data;
translating, by the payment platform, the financing credit history data into a third format compatible with a plurality of third party financing partner systems;
generating, by the payment platform and in a user interface, a plurality of financing options from the plurality of third party financing partner systems for one or more of the plurality of third party financing partner systems to pay for an existing and known amount of a healthcare bill that is currently owed for the completed healthcare service already provided to the patient, wherein the patient is obligated to pay back the known amount of the healthcare bill over time to the one or more of the plurality of third party financing partner systems, and wherein the plurality of financing options are based on the translated financing credit history data;
receiving, by the payment platform, a selection from the user interface of the one or more of the plurality of third party financing partner systems; and
establishing, by the payment platform, a communication channel between the user interface and the one or more of the plurality of third party financing partner systems.

\* \* \* \* \*